(12) United States Patent
Koshimizu et al.

(10) Patent No.: US 7,542,148 B2
(45) Date of Patent: Jun. 2, 2009

(54) METHOD FOR MEASURING PHYSICAL QUANTITY OF MEASUREMENT OBJECT IN SUBSTRATE PROCESSING APPARATUS AND STORAGE MEDIUM STORING PROGRAM FOR IMPLEMENTING THE METHOD

(75) Inventors: Chishio Koshimizu, Nirasaki (JP); Tomohiro Suzuki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 202 days.

(21) Appl. No.: 11/564,604

(22) Filed: Nov. 29, 2006

(65) Prior Publication Data
US 2007/0127034 A1 Jun. 7, 2007

Related U.S. Application Data

(60) Provisional application No. 60/754,611, filed on Dec. 30, 2005.

(30) Foreign Application Priority Data
Dec. 6, 2005 (JP) ............................. 2005-352003

(51) Int. Cl.
*G01B 11/02* (2006.01)
(52) U.S. Cl. ..................................... 356/497
(58) Field of Classification Search ................. 356/477, 356/479, 480, 497, 498, 500, 505, 506; 385/12
See application file for complete search history.

(56) References Cited

U.S. PATENT DOCUMENTS

| | | | | |
|---|---|---|---|---|
| 3,551,051 A | * | 12/1970 | Salgo | 356/51 |
| 5,633,715 A | * | 5/1997 | Ai et al. | 356/497 |
| 5,907,403 A | * | 5/1999 | Andrews et al. | 356/480 |
| 6,078,706 A | * | 6/2000 | Nau et al. | 385/12 |
| 6,842,254 B2 | * | 1/2005 | Van Neste et al. | 356/497 |
| 7,099,015 B2 | * | 8/2006 | Melnyk | 356/480 |
| 7,286,237 B2 | * | 10/2007 | Grossman et al. | 356/480 |

(Continued)

FOREIGN PATENT DOCUMENTS

JP    2003-307458    10/2003

OTHER PUBLICATIONS

Lenovo Support & downloads—Overview—ThinkPad X31, Sep. 23, 2005, accessed from http://www.ibm.com on Aug. 12, 2008.*

(Continued)

*Primary Examiner*—Michael A Lyons
*Assistant Examiner*—Scott M Richey
(74) *Attorney, Agent, or Firm*—Oblon, Spivak, McClelland, Maier & Neustadt, P.C.

(57) ABSTRACT

A method capable of accurately measuring a physical quantity of a measurement object in a substrate processing apparatus. In a temperature measurement apparatus for implementing the method, two interference positions are measured at different timings when a reference mirror is caused to move in the direction away from a collimator fiber, and a difference between the two interference positions is calculated. When the reference mirror remote from the collimator fiber is caused to move toward the collimator fiber, two interference positions are measured at different timings, and a difference between the two interference positions is calculated. An average value of the interference position differences is calculated, an optical path length difference is determined from the average value, and a wafer temperature is calculated from the optical path length difference.

14 Claims, 12 Drawing Sheets

U.S. PATENT DOCUMENTS

| | | | |
|---|---|---|---|
| 7,324,210 B2* | 1/2008 | De Groot et al. | 356/497 |
| 7,416,330 B2* | 8/2008 | Ito et al. | 374/127 |
| 2002/0085208 A1* | 7/2002 | Hauger et al. | 356/479 |
| 2002/0135774 A1* | 9/2002 | De Groot | 356/497 |
| 2002/0159671 A1* | 10/2002 | Boyd et al. | 385/12 |
| 2005/0078318 A1* | 4/2005 | De Groot | 356/497 |
| 2005/0151975 A1* | 7/2005 | Melnyk | 356/480 |
| 2005/0259716 A1* | 11/2005 | Ito et al. | 374/161 |

OTHER PUBLICATIONS

Carla Thornton, "IBM ThinkPad X31," Dec. 22, 2003, About.com, accessed http://pcworld.about.com/news/Dec222003id113971.htm on Aug. 12, 2008.*

* cited by examiner

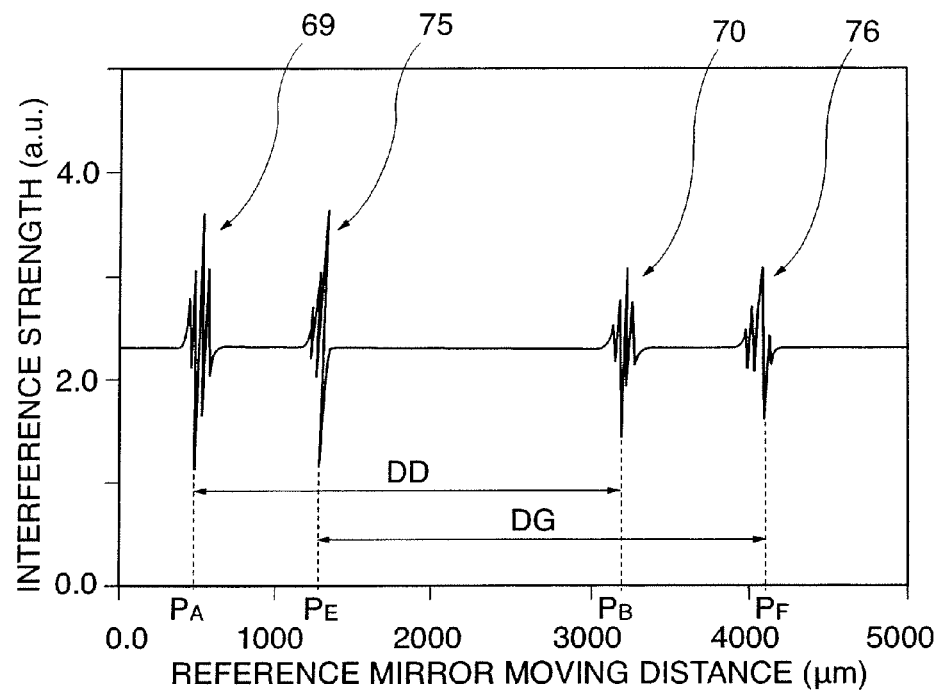
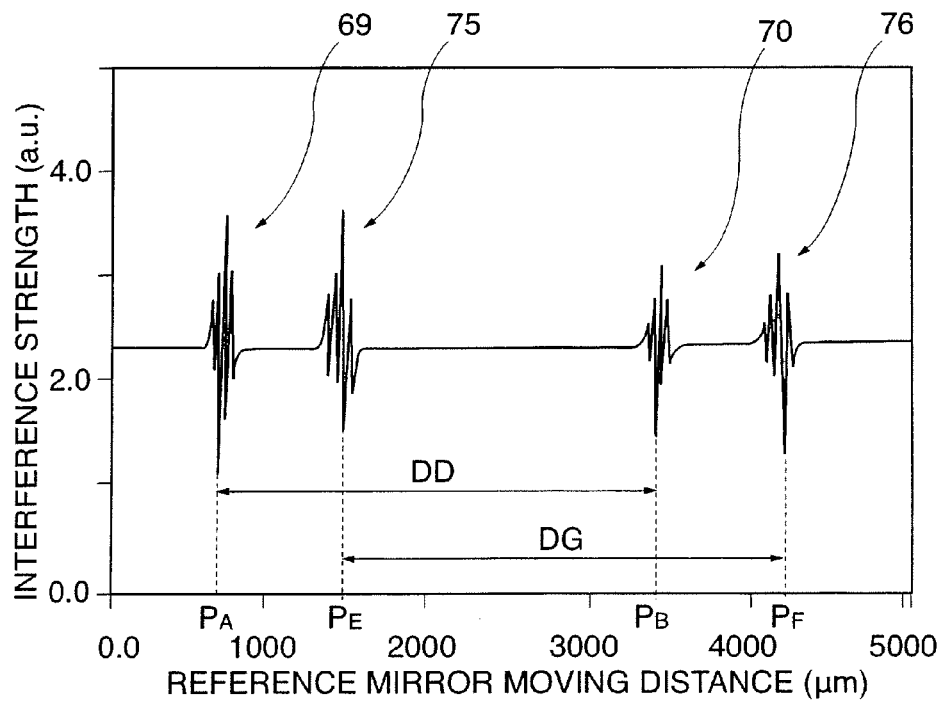

METHOD FOR MEASURING PHYSICAL QUANTITY OF MEASUREMENT OBJECT IN SUBSTRATE PROCESSING APPARATUS AND STORAGE MEDIUM STORING PROGRAM FOR IMPLEMENTING THE METHOD

BACKGROUND OF THE INVENTION

1. Field of the Invention

The present invention relates to a method for measuring a physical quantity of a measurement object in a substrate processing apparatus, and more particularly, to a physical quantity measuring method utilizing, for measurement, interference of irradiation light and reflected light, and a storage medium storing a program for implementing the measuring method.

2. Description of the Related Art

A substrate processing apparatus for plasma-processing a substrate such as a semiconductor device wafer has strongly been demanded to be capable of contactlessly measuring the temperature of a wafer housed in a processing chamber of the substrate processing apparatus. As a contactless thermometer, a radiation thermometer has been known that measures the temperature of a measurement object based on infrared radiation emitted from the measurement object. However, the substrate is mainly made of silicon whose infrared emission characteristic changes at a temperature of about 600 degrees Celsius, and therefore, the substrate temperature cannot be measured with accuracy, especially at low temperatures, by the radiation thermometer.

A temperature measurement apparatus has therefore recently been developed, in which the thickness of a substrate is measured contactlessly and converted into a corresponding temperature for measurement of substrate temperature. This temperature measurement apparatus utilizes a phenomenon that light irradiated from a low-coherence light source to a substrate is reflected by both the rear-side and front-side surfaces of the substrate. Specifically, in the temperature measurement apparatus, light irradiated from a single low-coherence light source is divided into measurement light and reference light. The measurement light is irradiated onto the substrate, and reflected light from the rear-side surface of the substrate and reflected light from the front-side surface thereof are received. On the other hand, the reference light is irradiated onto a reference mirror that is movable parallel to the direction in which the reference light is irradiated, and reflected light from the reference mirror is received. On the basis of reference mirror positions in each of which interference occurs between the reflected light from either surface of the substrate and that from the reference mirror, the light path length of the measurement light and each reflected light is calculated. Then, positions of the front-side and rear-side surfaces of the substrate are determined based on the calculated optical path lengths, and the substrate thickness is calculated from the determined positions of the substrate surfaces. Further, the calculated substrate thickness is converted into a corresponding substrate temperature (refer to Japanese Laid-open Patent Publication (Kokai) No. 2003-307458.

In the above temperature measurement apparatus, the measurement light and the reference light are respectively guided to the substrate and the reference mirror using optical fibers. In many cases, the optical fiber for guiding the reference light is disposed in a closed space isolated from the ambient environment of the substrate processing apparatus, whereas the optical fiber for guiding the measurement light is disposed to be exposed to the ambient environment.

In recent substrate plasma processing, the temperature in the processing chamber of the substrate processing apparatus is often positively changed, and therefore, the optical fiber for guiding the measurement light can increase in length with elapse of time by being heated by heat released from the substrate processing apparatus. Since the optical path length is affected by a change in optical fiber length, it is difficult to accurately measure the optical path length of the measurement light and that of the reflected light thereof when there is a change in temperature of the optical fiber for guiding the measurement light, which causes a change in optical fiber length. The above poses a problem that it is impossible to achieve an accurate measurement of a predetermined physical quantity (thickness, temperature, refractive index, or the like) of the substrate based on the optical path length.

SUMMARY OF THE INVENTION

An object of the invention is to provide a method for measuring a physical quantity of a measurement object in a substrate processing apparatus that is capable of accurately measuring a predetermined physical quantity of the measurement object and a storage medium storing a program for implementing the method.

To attain the above object, according to a first aspect of the present invention, there is provided a method for measuring a physical quantity of a measurement object in a substrate processing apparatus using a physical quantity measuring apparatus, the physical quantity measuring apparatus including a light receiving device that receives first reflected light of light irradiated on the measurement object and second reflected light of light irradiated on a movable reflection device, a movement control device that causes the reflection device to move so as to cause interference to occur between the first reflected light and the second reflected light, and a physical quantity calculation device that calculates a predetermined physical quantity of the measurement object based on a position of the reflection device in which the interference occurs. The method comprises the steps of (a) calculating a first interference position-related value that is related to a position of the reflection device in which interference occurs between the first reflected light and the second reflected light as the reflection device is caused to move in a first direction, (b) calculating a second interference position-related value that is related to a position of the reflection device in which interference occurs between the first reflected light and the second reflected light as the reflection device is caused to move in a second direction that is opposite to the first direction, and (c) calculating an average value of the first and second interference position-related values.

According to the first aspect of this invention, an average value of the first and second interference position-related values is calculated, whereby influences of a change in ambient temperature on the interference position-related values are canceled out, making it possible to measure the predetermined physical quantity of the measurement object with accuracy.

Preferably, the method further comprises a step of converting the calculated average value into a corresponding temperature of the measurement object.

With this preferred embodiment, the calculated average value is converted into a corresponding temperature of the measurement object, whereby the temperature of the measurement object can be measured accurately.

Preferably, the measurement object is in a form of plate, each of the first and second interference position-related values corresponds to thickness of the measurement object, and the predetermined physical quantity is the thickness of the measurement object.

With this preferred embodiment, the temperature of the measurement object can be measured more accurately.

More preferably, the light receiving device receives the first reflected light from a front-side surface of the measurement object and the first reflected light from a rear-side surface of the measurement object, the first interference position-related value corresponds to a difference between a position of the reflection device in which interference occurs between the first reflected light from the rear-side surface of the measurement object and the second reflected light and a position of the reflection device in which interference occurs between the first reflected light from the front-side surface of the measurement object and the second reflected light as the reflection device is caused to move in the first direction, and the second interference position-related value corresponds to a difference between a position of the reflection device in which interference occurs between the first reflected light from the front-side surface of the measurement object and the second reflected light and a position of the reflection device in which interference occurs between the first reflected light from the rear-side surface of the measurement object and the second reflected light as the reflection device is caused to move in the second direction.

With the above preferred embodiment, the thickness of the measurement object can be measured accurately based on the first and second interference position-related values.

More preferably, the light receiving device receives the first reflected light from each of a plurality of measurement points on the front-side surface of the measurement object and the first reflected light from each of a plurality of measurement points on the rear-side surface of the measurement object corresponding to respective ones of the plurality of measurement points on the front-side surface. There are a plurality of the first interference position-related values corresponding in number to the plurality of measurement points and each corresponding to the thickness of the measurement object, and there are a plurality of the second interference position-related values corresponding in number to the plurality of measurement points and each corresponding to the thickness of the measurement object. One of the plurality of the first interference position-related values is selected and one of the plurality of the second interference position-related values is selected, and the thickness of the measurement object is calculated based on the selected first and second interference position-related values.

With this preferred embodiment, the first and second interference position-related values at measurement positions which are hard to be affected by variation factors other than temperature can be selected, whereby the temperature of the measurement object can be measured more accurately.

Preferably, a speed at which the reflection device is caused to move in the first direction is equal to a speed at which the reflection device is caused to move in the second direction.

According to the just-mentioned preferred embodiment, the absolute amount of influence of a change in ambient temperature on the first interference position-related value can be made equal to that on the second interference position-related value, making it possible to more accurately measure the predetermined physical quantity of the measurement object.

Preferably, a difference between a timing in which the interference occurs between the first reflected light from the rear-side surface of the measurement object and the second reflected light and a timing in which the interference occurs between the first reflected light from the front-side surface of the measurement object and the second reflected light as the reflection device is caused to move in the first direction is equal to a difference between a timing in which the interference occurs between the first reflected light from the front-side surface of the measurement object and the second reflected light and a timing in which the interference occurs between the first reflected light from the rear-side surface of the measurement object and the second reflected light as the reflection device is caused to move in the second direction.

With the above preferred embodiment, even if there is a change in the moving speed of the reflection device, the absolute amount of influence of a change in ambient temperature on the first interference position-related value can be made equal to that on the second interference position-related value, whereby the predetermined physical quantity of the measurement object can be measured more accurately.

To attain the above object, according to a second aspect of the present invention, there is provided a method for measuring a physical quantity of a measurement object in a substrate processing apparatus, which is basically the same as the method according to the first aspect of this invention. The method comprises the steps of (a) calculating a first interference position-related value that is related to a position of the reflection device in which interference occurs between the first reflected light and the second reflected light as the reflection device is caused to move in a first direction, (b) calculating a first rate of change in ambient temperature as the reflection device is caused to move in the first direction, (c) calculating a second interference position-related value that is related to a position of the reflection device in which interference occurs between the first reflected light and the second reflected light as the reflection device is caused to move in a second direction that is opposite to the first direction, (d) calculating a second rate of change in ambient temperature as the reflection device is caused to move in the second direction, (e) correcting the first interference position-related value based on the first rate of change in ambient temperature, and (f) correcting the second interference position-related value based on the second rate of change in ambient temperature.

According to the second aspect of the present invention, even if the first rate of change in ambient temperature as the reflection device is caused to move in the first direction differs from the second rate of change in ambient temperature as the reflection device is caused to move in the second direction, influences of a change in ambient temperature on the first and second interference position-related values are accurately removed, making it possible to accurately measure the predetermined physical quantity of the measurement object.

Preferably, the method further comprises a step of calculating an average value of the first and second interference position-related values, and a step of converting the calculated average value into a corresponding temperature of the measurement object.

With the preferred embodiment, even if influences of a change in ambient temperature on the interference position-related values still remain, these influences can be canceled out, making it possible to reliably and accurately measure the temperature of the measurement object.

Preferably, the method further comprises a step of selecting either one of the first and second interference position-related values based on a comparison between the first and second rates of change in ambient temperature, and a step of converting the selected one of the first and second interference position-related values into a corresponding temperature of the measurement object.

With the above preferred embodiment, the temperature of the measurement object can be measured based on the interference position-related value which is less affected by a change in ambient temperature, whereby the temperature of the measurement object can be measured with reliability and accuracy.

To attain the above object, according to a third aspect of the present invention, there is provided a method for measuring a physical quantity of a measurement object in a substrate processing apparatus, which is basically the same as the methods according to the first and second aspects of this invention. The method comprises the steps of (a) calculating a first interference position-related value that is related to a position of the reflection device in which interference occurs between the first reflected light and the second reflected light as the reflection device is caused to move in a first direction, (b) calculating a first rate of change in ambient temperature as the reflection device is caused to move in the first direction, (c) calculating a second interference position-related value that is related to a position of the reflection device in which interference occurs between the first reflected light and the second reflected light as the reflection device is caused to move in a second direction that is opposite to the first direction, (d) calculating a second rate of change in ambient temperature as the reflection device is caused to move in the second direction, (e) determining whether or not the first and second rates of change in ambient temperature fall within a predetermined range, (f) calculating an average value of the first and second interference position-related values when the first and second rates of change in ambient temperature fall within the predetermined range, and (g) correcting at least one of the first and second interference position-related values based on at least corresponding one of the first and second rates of change in ambient temperature when the at least corresponding one of the first and second rates of change in ambient temperature falls outside the predetermined range.

According to the third aspect of the present invention, an average value of the first and second interference position-related values is calculated, whereby influences of change in ambient temperature on these interference position-related values are canceled out. Even if the first rate of change in ambient temperature observed as the reflection device is caused to move in the first direction differs from the second rate of change in ambient temperature observed as the reflection device is caused to move in the second direction, influences of a change in ambient temperature on the first and second interference position-related values can be accurately removed. As a result, the predetermined physical quantity of the measurement object can be measured with accuracy. Furthermore, since the way of calculating the predetermined physical quantity is changed according to the result of comparison between the rates of change in ambient temperature and the predetermined range, the predetermined physical quantity can be measured efficiently.

To attain the aforementioned object, according to the present invention, storage media are provided each storing a program for implementing a corresponding one of the methods according to the first to third embodiments.

Further features of the present invention will become apparent from the following description of exemplary embodiments with reference to the attached drawings.

BRIEF DESCRIPTION OF THE DRAWINGS

FIGS. 4A and 4B are graphs showing waveforms of interferences detected by a PH shown in FIG. 3 between reflected light from a wafer and reflected light from a reference mirror, wherein FIG. 4A shows interference waveforms obtained before the occurrence of change in wafer temperature, and FIG. 4B shows interference waveforms obtained after the occurrence of change in wafer temperature;

FIGS. 12A and 12B are graphs showing waveforms of interference between reflected light from a central part of a wafer and reflected light from a reference mirror and of interference between reflected light from a peripheral part of the wafer and the reflected light from the reference mirror, wherein FIG. 12A shows interference waveforms obtained before the occurrence of change in wafer temperature and FIG. 12B shows interference waveforms obtained after the occurrence of change in wafer temperature.

DETAILED DESCRIPTION OF THE PREFERRED EMBODIMENTS

The present invention will now be described in detail below with reference to the drawings showing preferred embodiments thereof.

First, an explanation will be given of a substrate processing apparatus to which is applied a method for measuring a physical quantity of a measurement object according to a first embodiment of the present invention.

Figure 1:
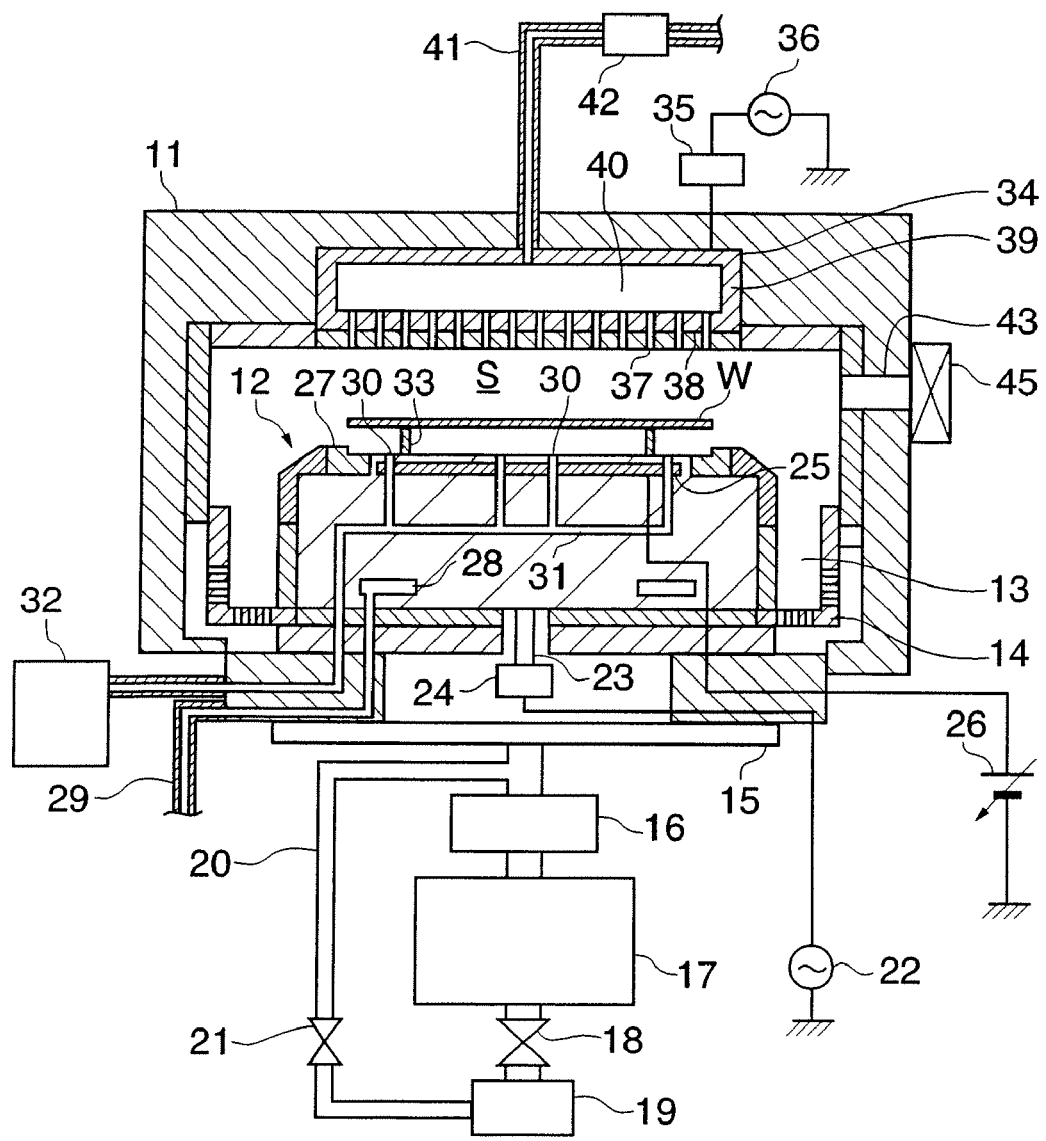
FIG. 1 is a section view showing a schematic construction of a substrate processing apparatus to which is applied a method for measuring a physical quantity of a measurement object in a substrate processing apparatus according to an embodiment of the present invention.

FIG. 1 is a section view showing a schematic construction of the substrate processing apparatus. A plasma processing apparatus as the substrate processing apparatus is designed that a semiconductor wafer W as a substrate (hereinafter simply referred to as the "wafer W") is subjected to plasma processing such as RIE (Reactive Ion Etching) and ashing.

Referring to FIG. 1, the plasma processing apparatus 10 includes a cylindrical chamber 11 made of aluminum and having a wall whose inner surface is coated with anodized aluminum. In the chamber 11, a cylindrical mounting table 12 is disposed, which serves as a stage for mounting thereon the wafer W having a diameter of, e.g., 300 mm.

In the plasma processing apparatus 10, a gas exhaust path 13, serving as a channel for discharging gas existing above the mounting table 12 to the outside of the chamber 11, is formed between an inner peripheral surface of the wall of the chamber 11 and a peripheral surface of the mounting table 12. An annular baffle plate 14 for preventing leakage of plasma is disposed in the middle of the gas exhaust path 13. A portion of the gas exhaust path 13 downstream of the baffle plate 14 extends under the mounting table 12 to be in communication with an automatic pressure control valve 15 (hereinafter referred to as the "APC valve") that is a variable butterfly valve. The APC valve 15 is connected through an isolator valve 16 to a turbo molecular pump 17 (hereinafter referred to as the "TMP"), which is a gas exhaust pump for vacuum exhaust. The TMP 17 is connected through a valve 18 to a dry pump 16 (hereinafter referred to as the "DP") serving as a gas exhaust pump. In a gas exhaust channel (hereinafter referred to as the "main pumping line") formed by the APC valve 15, isolator valve 16, TMP 17, valve 18, and DP 19, the APC valve 15 controls pressure in the chamber 11 and the TMP 17 and DP 19 depressurize the chamber 11 almost to vacuum.

A pipe 20 extending from between the APC valve 15 and the isolator valve 16 is connected to the DP 19 through the valve 21. A gas exhaust channel (bypass line) is formed by the pipe 20 and the valve 12 so as to bypass the MP 17, and the DP 19 roughs the chamber 11.

A high frequency power supply 22 for lower electrode is connected via a power supply rod 23 and a matcher 24 to the mounting table 12, and supplies predetermined high frequency electric power to the mounting table 12. Thus, the mounting table 12 functions as a lower electrode. The matcher 24 reduces reflection of high frequency electric power from the mounting table 12 to thereby maximize the efficiency of high frequency electric power supply to the mounting table 12.

A circular ESC electrode plate 25 formed of an electrically conductive film is disposed inside an upper portion of the mounting table 12, and a DC power source 26 is electrically connected to the ESC electrode plate 25. The wafer W is attracted and held on the top surface of the mounting table 12 by Coulomb force or Johnsen-Rahbek force produced by a DC voltage applied to the ESC electrode plate 25 from the DC power supply 26. An annular focus ring 27 is disposed above the mounting table 12 so as to surround the wafer W attracted and held onto the top surface of the mounting table 12. The focus ring 27 is formed of silicon (Si), silicon carbide (SiC), or quartz (Qz), is exposed to a processing space S, described later, and converges plasma in the processing space S toward the surface of the wafer W to thereby improve the efficiency of plasma processing.

A coolant chamber 28 of, e.g., a ring shape extending circumferentially is provided inside the mounting table 12. A coolant, e.g., cooling water or Garden™, kept at a specific temperature is supplied to the coolant chamber 28 from a chiller unit (not shown) via a coolant pipe 29 to be circulated therein, whereby the temperature of the mounting table 12 and by extension the temperature of the wafer W attracted and held onto on the top surface of the mounting table 12 is controlled by the coolant.

In the top surface of the mounting table 12, thermally conductive gas supply holes 30 facing the wafer W are opened to a portion onto which the wafer is attracted (hereinafter referred to as the "attracting surface"). Those thermally conductive gas supply holes 30 are connected to a thermally conductive gas supply unit 32 though a thermally conductive gas supply line 31 arranged in the mounting table 12. The thermally conductive gas supply unit 32 supplies a thermally conductive gas, e.g., Helium (He) gas, into a gap between the attracting surface and the rear-side surface of the wafer W through the thermally conductive gas supply holes 30. The thermally conductive gas supply holes 30, the thermally conductive gas supply line 31, and the thermally conductive supply unit 32 form a thermally conductive gas supply apparatus. It should be noted that the kind of the back side gas is not limited to Helium, but may be an inactive gas, such as Nitrogen ($N_2$), Argon (Ar), Krypton (Kr), or xenon (Xe), or may be oxygen ($O_2$) or the like.

On the attracting surface of the mounting table 12, there are disposed three pusher pins 33 which are lift pins that are capable of protruding from the top surface of the mounting table 12. These pusher pins 33 are coupled to a motor (not shown) via a ball screw (not shown), and freely protrudes from the attracting surface with a linear movement of the ball screw into which a rotational movement of the motor output shaft is converted. When the wafer W to be subjected to plasma processing is attracted and held onto the attracting surface, the pusher pins 33 are received in the mounting table 12. When the wafer W for which plasma processing has been finished is taken out from the chamber 11, the pusher pins 33 are caused to protrude from the top surface of the mounting table 12 to lift up the wafer W away from the mounting table 12.

Figure 2:
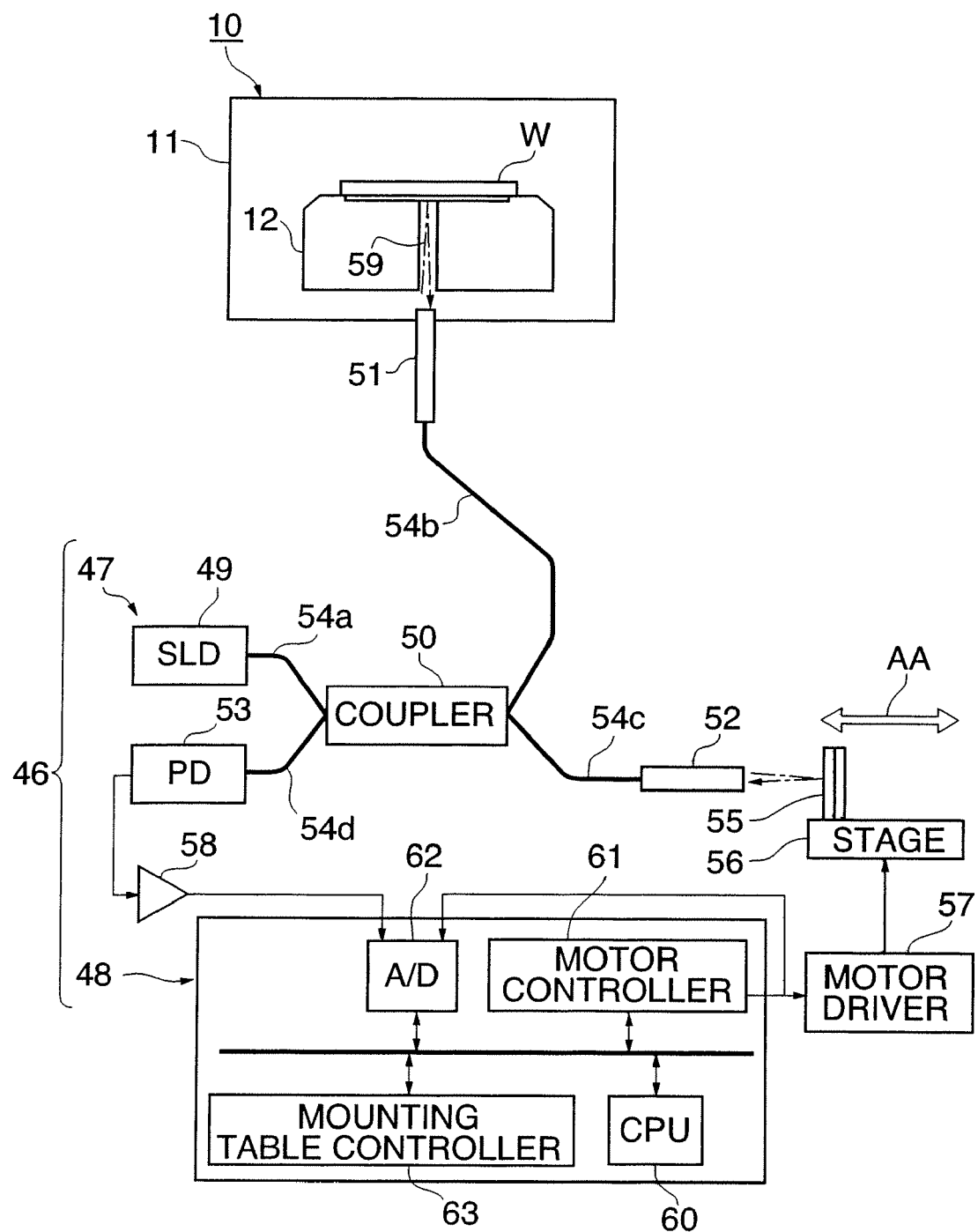
FIG. 2 is a block diagram showing a schematic construction of a temperature measurement apparatus for measuring the wafer temperature in the plasma processing apparatus shown in FIG. 1.

As shown in FIG. 2 described in detail later, a temperature detection hole 59, which is used for measurement of the temperature (predetermined physical quantity) of the wafer W, is opened to the attracting surface of the mounting table 12.

A gas inlet shower head 34 is disposed in a ceiling portion of the chamber 11. The gas inlet shower head 34 is connected through a matcher 35 to a high frequency power supply 36 for upper electrode, which applies predetermined high frequency power to the gas inlet shower head 34. Accordingly, the gas inlet shower head 34 functions as an upper electrode. It should be noted that the matcher 35 has the same function as the matcher 24.

The gas inlet shower head 34 includes a ceiling electrode plate 38 formed with a large number of gas holes 37 and an electrode support member 39 for removably supporting the ceiling electrode plate 38. The electrode support member 39 is provided therein with a buffer chamber 40 to which is connected a processing gas inlet pipe 41 extending from a processing gas supply unit (not shown). A pipe insulator 42 is installed in the middle of the processing gas inlet pipe 41. The pipe insulator 12 is made of an insulating material and prevents the high frequency power supplied to the gas inlet shower head 34 from leaking to the processing gas supply unit via the processing gas inlet pipe 41. The gas inlet shower head 34 supplies, via the gas holes 37, the chamber 11 with the processing gas that is supplied from the processing gas inlet pipe 41 to the buffer chamber 40.

The chamber 11 is provided at its circumferential wall with a loading/unloading port 43 for the wafer W at a location corresponding to a vertical position to which the wafer W is lifted up by the pusher pins 33 away from the mounting table 12. The loading/unloading port 43 is mounted with a gate valve 45 for opening and closing the loading/unloading port 43.

As described above, in the chamber 11 of the plasma processing apparatus 10, high frequency power is supplied to the mounting table 12 and the gas inlet shower head 34 to thereby apply the high frequency power to the processing space S between the mounting table 12 and the gas inlet shower head 34. As a result, a high-density plasma is generated in the processing space S from the processing gas supplied from the gas inlet shower head 34, and is utilized for plasma processing of the wafer W.

Specifically, for the plasma processing of the wafer W in the plasma processing apparatus 10, after the gate valve 45 is opened, the wafer W to be processed is loaded into the chamber 11, and a DC voltage is applied to the ESC electrode plate 25, whereby the loaded wafer W is attracted and held on the attracting surface of the mounting table 12. Then, the processing gas (e.g., a mixture gas comprised of $CF_4$ gas and $O_2$ gas with a predetermined flow rate ratio) is supplied from the gas inlet shower head 34 into the chamber 11 at a predetermined amount of flow and flow rate, and the pressure in the chamber 11 is controlled to a predetermined pressure value by means of the APC valve 15 and the like. Furthermore, high frequency power is applied from the mounting table 12 and the gas inlet shower head 34 to the processing space S in the chamber 11. As a result, plasma is generated in the processing space S from the processing gas introduced from the gas inlet shower head 34, and is caused by means of the focus ring 27 to converge onto the surface of the wafer W which is then subjected to physical or chemical etching.

It should be noted that the operations of the aforementioned various parts of the plasma processing apparatus 10 are controlled by a controller (not shown) such as a computer which operates in accordance with a program for the plasma processing.

FIG. 2 is a block diagram showing a schematic construction of a temperature measurement apparatus for measuring wafer temperature in the plasma processing apparatus shown in FIG. 1.

Referring to FIG. 2, the temperature measurement apparatus 46 (physical quantity measurement apparatus) includes an optical system for low-coherence light 47 (light receiving device) for irradiating low-coherence light onto the wafer W or the like in the plasma processing apparatus 10 and for receiving reflected light of the irradiated low-coherence light, and a temperature calculation device 48 (physical quantity calculation device) for calculating the wafer temperature or the like based on the reflected light received by the optical system for low-coherence light 47. Low-coherence light is characterized in that, when irradiated from a light source and subsequently split into two parts, these two parts of light have their wave trains which are hard to overlap (interfere with) each other, and in that it has a short coherence length.

The optical system for low-coherence light 47 is comprised of a super luminescent diode (SLD) 49 as a low-coherence light source, an optical fiber coupler 50 as a 2×2 splitter connected to the SLD 49, collimator fibers 51, 52 connected to the optical fiber coupler 50, a photo detector (PD) 53 as a light receiving device connected to the optical fiber coupler 50, and optical fibers 54*a*, 54*b*, 54*c*, 54*d* through which the just-mentioned components are connected.

The SLD 49 irradiates low-coherence light with the maximum power of 1.5 mW, wherein the low-coherence light has its central wave length of 1.55 μm or 1.31 μm and coherence length of about 50 μm. The optical fiber coupler 50 splits the low-coherence light from the SLD 49 into two, and the two light beams are transmitted through the optical fibers 54*b*, 54*c* to the collimator fibers 51, 52, respectively. The collimator fibers 51, 52 are comprised of collimators for irradiating, at right angles, the low-coherence light beams having been split by the optical fiber coupler 50 (corresponding to measurement light 64 and reference light 65 described later) onto the rear-side surface of the wafer W and the reflection surface of a reference mirror 55 (mentioned later), respectively. The PD 53 is formed by a Ge photo diode.

The optical system for low-coherence light 47 is comprised of the reference mirror 55 (reflection device) disposed in front of the collimator fiber 52, a reference mirror driving stage 56 for causing, using a stepping motor (not shown), the reference mirror 55 to horizontally move in the direction in which the low-coherence light is irradiated from the collimator fiber 52, a motor driver 57 (movement control device) for driving the stepping motor of the reference mirror driving stage 56, and an amplifier 58 connected to the PD 53 for amplifying an output signal of the PD 53. The reference mirror 55 is comprised of a corner cube prism or a planar mirror.

The collimator fiber 51 is disposed to face the rear-side surface of the wafer W through the temperature detection hole 59 formed in the mounting table 12. The collimator fiber 51 irradiates, via the temperature detection hole 59, part (measurement light 64, mentioned later) of the low-coherence light, split into two by the optical fiber coupler 50, toward the rear-side surface of the wafer W which is a measurement object, receives reflected light of the low-coherence light reflected from the wafer W (reflected light 66*a* and reflected light 66*b*, mentioned later), and transmits the received light to the PD 53.

The collimator fiber 52 irradiates part of the low-coherence light, split into two by the optical fiber coupler 50 (reference light 65 mentioned later), toward the reference mirror 55, receives reflected light (reflected light 68 mentioned later) from the reference mirror 55, and transmits the received light to the PD 53.

The reference mirror driving stage 56 causes the reference mirror 55 to horizontally move in the direction shown by arrow AA in FIG. 2 in such a manner that the reflection surface is always kept perpendicular to light irradiated from the collimator fiber 52. The reference mirror 55 can be reciprocated in the direction shown by the arrow AA (i.e., the direction in which the low-coherence light is irradiated from the collimator fiber 52).

The temperature calculation device 48 is comprised of a computer, for instance, and includes a CPU 60 for overall controlling the temperature calculation device 48, a motor controller 61 (movement control device) for controlling via a motor driver 57 a stepping motor for moving the reference mirror 55, an A/D converter 62 for analogue-to-digital converting the output of the PD 53, which is input to the A/D converter 62 via the amplifier 58 of the optical system for low-coherence light 47, in synchronism with a control signal (driving pulse, for instance) output from the motor controller 61 to the motor driver 57, and a mounting table controller 63 for controlling operating sections provided on the mounting table 12. The mounting table controller 63 controls high frequency power supplied from the high frequency power source 22, temperature, flow rate and pressure of the back side gas supplied from the thermally conductive gas supply unit 32, temperature of coolant circulatingly supplied to the coolant chamber 28, DC voltage applied to the ESC electrode plate 25, and the like.

Figure 3:
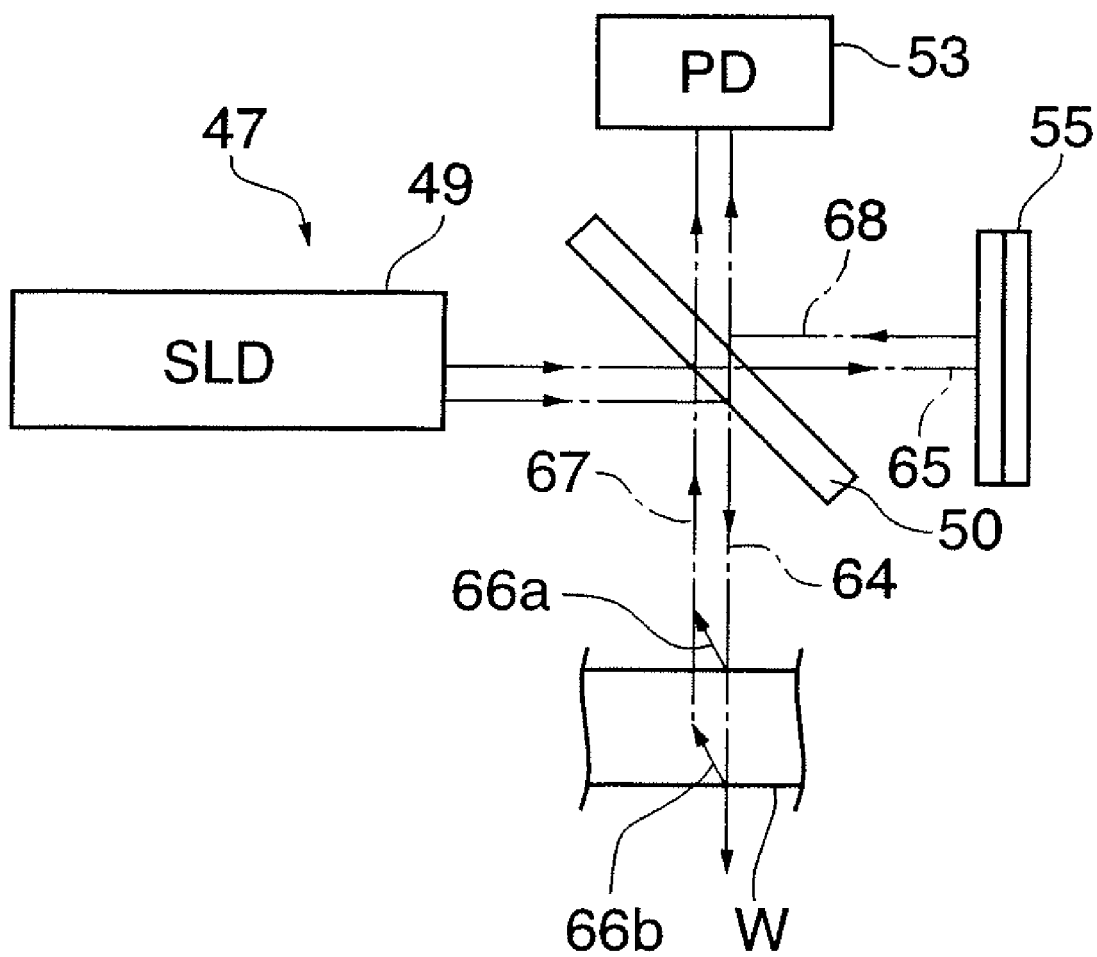
FIG. 3 is a view useful in explaining a temperature measurement operation of an optical system for low-coherence light shown in FIG. 2.

FIG. 3 is a view useful in explaining a temperature measurement operation of the optical system for low-coherence light shown in FIG. 2.

The optical system for low-coherence light 47 utilizes a low-coherence interferometer whose basic configuration is based on the Michelson's interferometer. As shown in FIG. 3, the low-coherence light emitted from the SLD 49 is split into measurement light 64 and reference light 65 by means of the optical fiber coupler 50 functioning as a splitter. Then, the measurement light 64 is irradiated toward the wafer W as the measurement object, whereas the reference light 65 is irradiated toward the reference mirror 55.

The measurement light 64 irradiated onto the wafer W is reflected on both the rear-side and front-side surfaces of the wafer W. Both the reflected light 66a (first reflected light) from the rear-side surface of the wafer W and the reflected light 66b (first reflected light) from the front-side surface of the wafer W are incident on the optical fiber coupler 50 in the same optical path 67. The reference light 65 irradiated onto the reference mirror 55 is reflected on the reflection surface, and the reflected light 68 (second reflected light) from the reflection surface is also incident on the optical fiber coupler 50. At this time, as described above, the reference mirror 55 is caused to horizontally move in the direction of radiation of the reference light 65. Thus, the optical system for low-coherence light 47 can vary the total optical path length of the reference light 65 and the reflected light 68.

In a case where the total optical path length of the reference light 65 and the reflected light 68 is varied by horizontally moving the reference mirror 55, interference occurs between the reflected light 66a and the reflected light 68 when the total optical path length of the measurement light 64 and the reflected light 66a coincides with that of the reference light 65 and the reflected light 68. When the total optical path length of the measurement light 64 and the reflected light 66b coincides with the that of the reference light 65 and the reflected light 68, interference occurs between the reflected light 66b and the reflected light 68. These interferences are detected by the PD 53. When detecting the interference, the PD 53 outputs an output signal.

Figure 4A:
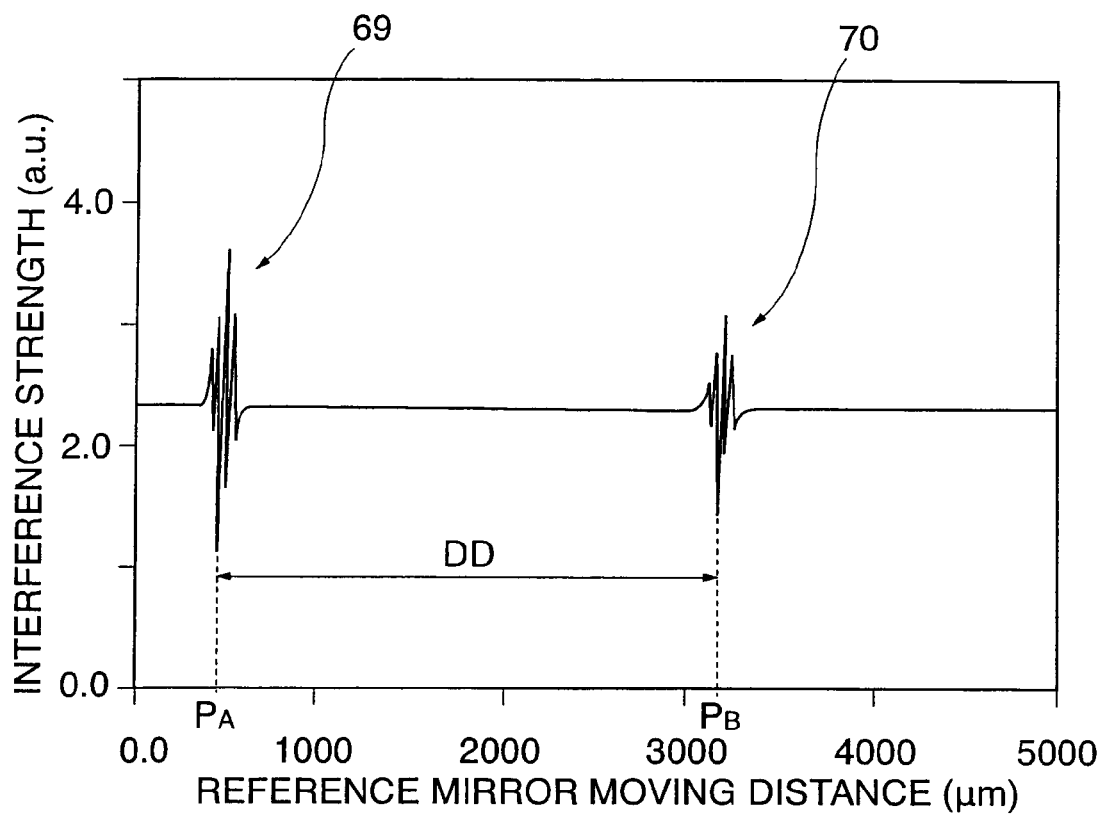
Figure 4B:
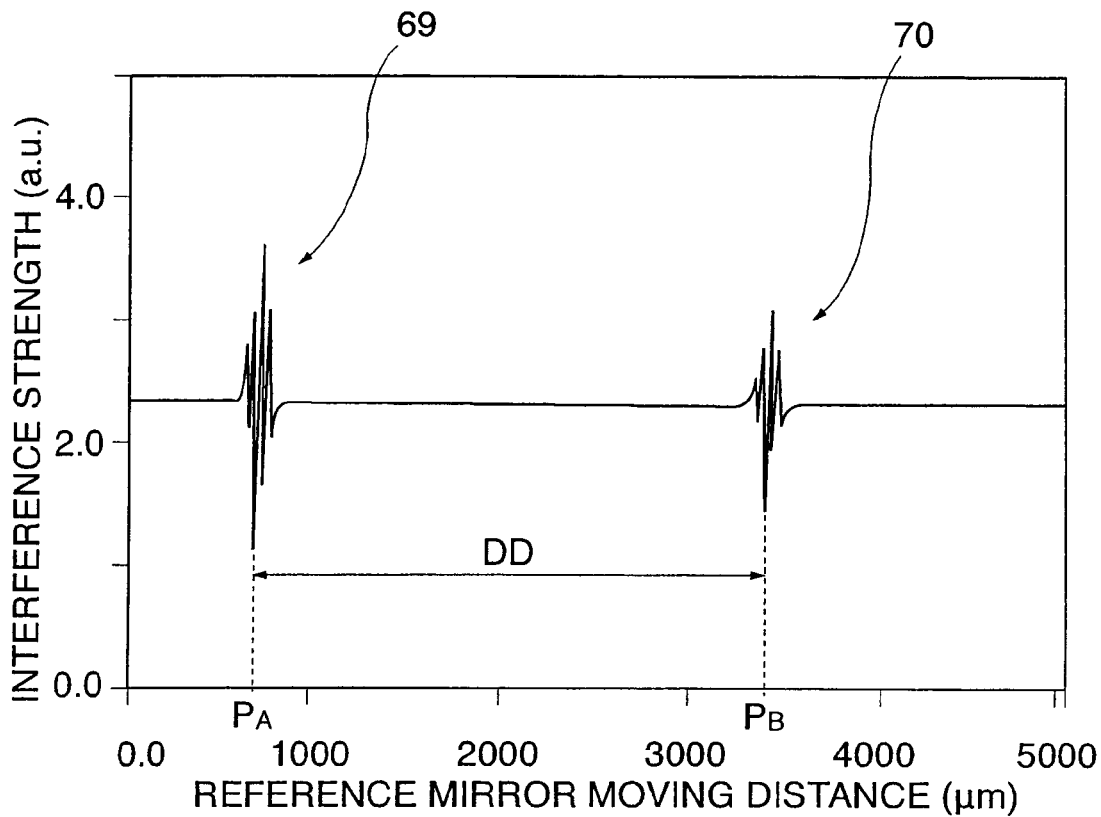

FIGS. 4A and 4B are graphs showing waveforms of interferences detected by the PD shown in FIG. 3 between the reflected light from the wafer and that from the reference mirror. FIG. 4A shows interference waveforms obtained before the occurrence of change (increase in this example) in wafer temperature, whereas FIG. 4B shows interference waveforms obtained after the occurrence of wafer temperature change. In FIGS. 4A and 4B, the interference strength is taken along the ordinate, whereas the horizontal moving distance of the reference mirror from a predetermined basic point (hereinafter simply referred to as the "reference mirror moving distance") is taken along the abscissa.

As shown in the graph of FIG. 4A, when the reference light 68 from the reference mirror 55 interferes with the reflected light 66a from the rear-side surface of the wafer W, an interference waveform 69, for instance, is detected that has a width of about 80 μm centered at the interference position PA of about 425 μm (where the interference strength has a peak value). When the reference light 68 from the reference mirror 55 interferes with the reference light 66b from the front-side surface of the wafer W, an interference waveform 70, for instance, is detected that has a width of about 80 μm centered at the interference position PB of about 3285 μm (where the interference strength has a peak value). The interference position PA corresponds to the total optical path length of the measurement light 64 and the reflected light 66a, whereas the interference position PB corresponds to that of the measurement light 64 and the reflected light 66b. Accordingly, the difference DD between the interference positions PA and PB corresponds to the difference between the optical path length of the reference light 66a and that of the reference light 66b (hereinafter simply referred to as the "optical path length difference"). Furthermore, the difference DD between the optical path lengths of the interference positions PA and PB corresponds to the optical thickness of the wafer W. By detecting the interference between the reflected light 68 and the reflected light 66a and the interference between the reflected light 68 and the reflected light 66b, it is possible to detect the optical thickness of the wafer W.

When there occurs a change in the temperature of the wafer W, the thickness of the wafer W varies due to thermal expansion (contraction) and the refractive index also varies, resulting in changes in the total optical path length of the measurement light 64 and the reflected light 66a and in the total optical path length of the measurement light 64 and the reflected light 66b. After the occurrence of a change in the temperature of the wafer W, therefore, the optical thickness of the wafer W varies due to thermal expansion and the like, so that both the interference positions PA, PB of the reflected light 68 and the reflected light 66a and of the reflected light 68 and the reflected light 66b shift from the interference positions shown in FIG. 4A. Specifically, as shown in the graph of FIG. 4B, the interference positions PA and PB shift from those shown in FIG. 4A in the direction of increasing the reference mirror moving distance (when the wafer temperature changes in the increasing direction). As described above, with a change in the temperature of the wafer W, a shift occurs in the interference positions PA, PB. By calculating the difference DD between the interference positions PA, PB or the optical path length difference, it is possible to measure the temperature of the wafer W. It should be noted that, as the causes for a change in the optical path length there can be mentioned positional changes (such as elongations) of various components of the optical system for low-coherence light 47, in addition to a change in optical thickness of the wafer W.

In the present embodiment, prior to the measurement of temperature of wafer W, there is prepared in advance a temperature conversion database in which optical path length difference is associated with temperature of wafer W, such as for example, a tabulated database that includes, as database axes, temperature of wafer W and optical path length difference. Alternatively, there is prepared in advance a regression formula that includes, as variables, temperature of wafer W and optical path length difference. The prepared database or formula is stored, for example, in a memory (not shown) of the temperature calculation device 48. In measuring the temperature of the wafer W, the optical system for low-coherence light 47 causes output signals of the PD 53 representative of the interference positions PA and PB to be input in sequence to the temperature calculation device 48. The temperature calculation device 48 calculates an optical path length difference based on the signals supplied thereto, and converts the optical path length difference into a corresponding temperature on the basis of the temperature conversion database or the regression formula. This makes it possible to measure the temperature of the wafer W contactlessly with high accuracy.

The optical path of the measurement light 64 and the reflected light 66a is formed by the optical fiber 54b and a space extending between the collimator fiber 51 and the rear-side surface of the wafer W, whereas the optical path of the measurement light 64 and the reflected light 66b is formed by the optical fiber 54b, the space extending between the collimator fiber 51 and the rear-side surface of the wafer W, and the wafer W. When the temperature of the optical fiber 54b changes with a change in ambient temperature around the optical fiber 54b, there occur changes in length and refractive index of the optical fiber 54b, and as a result, accurate measurement of the optical path length difference may not be possible. It should be noted that in many cases the tendency of change in ambient temperature around the optical fiber 54b is stable. For instance, the ambient temperature around the optical fiber 54b increases at a constant speed. Therefore, the temperature of the optical fiber 54b often increases at a constant speed.

Figure 5:
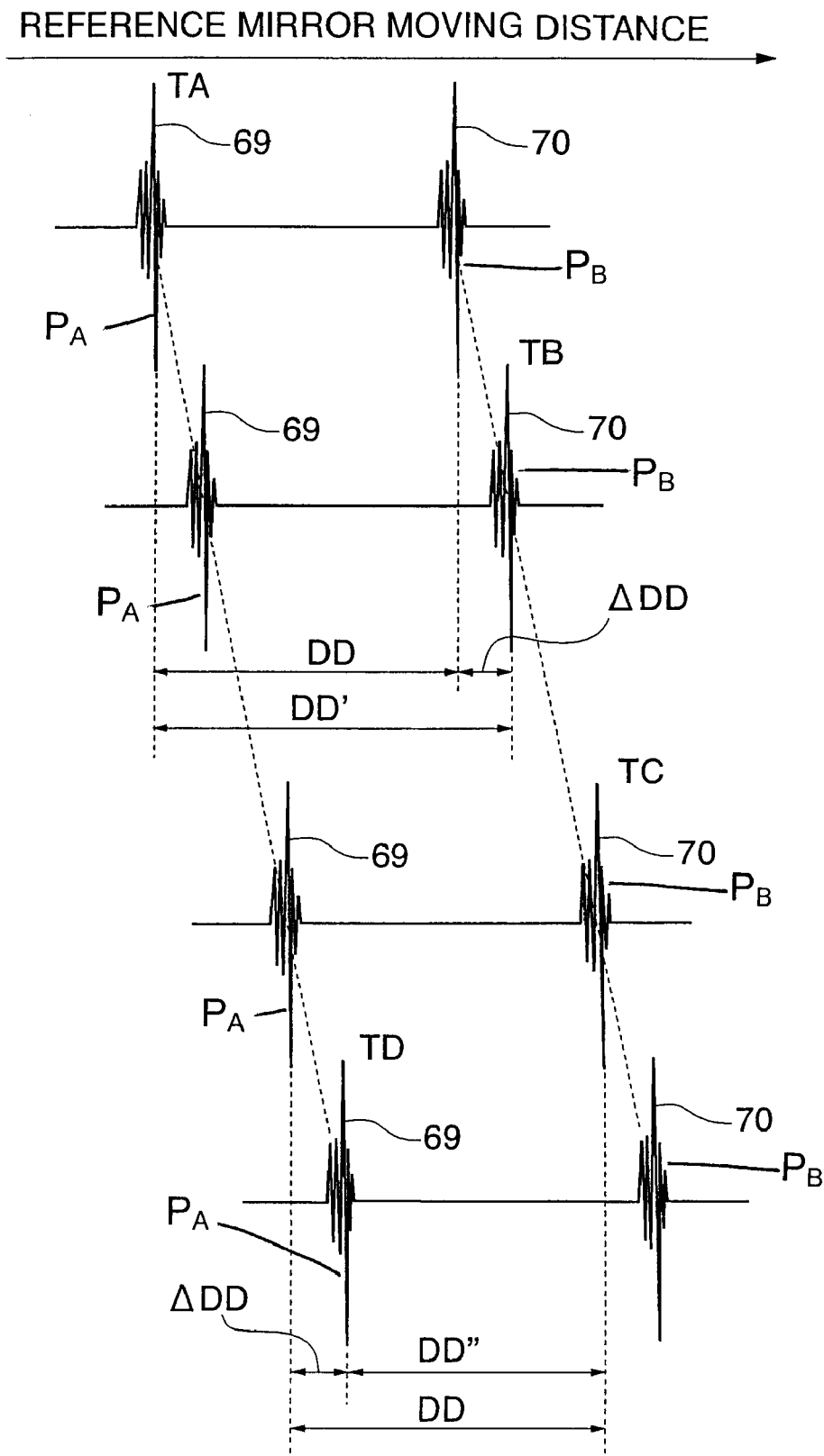
FIG. 5 is a view showing shifts in interference positions occurring with reciprocal movement of the reference mirror in the direction shown by arrow AA in FIG. 2 in a case where the wafer temperature varies.

FIG. 5 is a view showing shifts in interference positions occurring with reciprocal movement of the reference mirror in the direction shown by arrow AA in FIG. 2 in a case where the wafer temperature varies. In FIG. 5, it is assumed that the temperature of the optical fiber 54b increases at a constant speed.

In FIG. 5, four pairs of interference waveforms 69, 70 are shown to correspond to respective ones of four different timings (shown by symbols TA to TD) at each of which one of each interference waveform pair 69, 70 is detected. The other of each interference waveform pair is shown for convenience for explanation. Symbol TA indicates a timing in which interference between the reflected light 68 from the reference mirror 55 and the reference light 66a from the rear-side surface of the wafer W (interference waveform 69) is detected as the reference mirror 55 is caused to move in the direction away from the collimator fiber 52 (hereinafter referred to as "in the forward stroke"). Symbol TB indicates a timing in which interference between the reflected light 68 from the reference mirror 55 and the reference light 66b from the front-side surface of the wafer W (interference waveform 70) is detected in the forward stroke. Symbol TC indicates a timing in which interference between the reflected light 68 from the reference mirror 55 and the reference light 66b from the front-side surface of the wafer W (interference waveform 70) is detected as the reference mirror 55 remote from the collimator fiber 52 is caused to move in the direction toward the collimator fiber 52 (hereinafter referred to as the "in the backward stroke"). Symbol TD indicates a timing in which interference between the reflected light 68 from the reference mirror 55 and the reference light 66a from the rear-side surface of the wafer W (interference waveform 69) is detected in the backward stroke.

At the timing TA in the forward stroke, the interference waveform 69 corresponding to the rear-side surface of the wafer W is detected, whereby the interference position PA shown in FIGS. 4A and 4B, which is the center position of the interference waveform 69, is measured. Subsequently, in order to detect the interference waveform 70 corresponding to the front-side surface of the wafer W, the reference mirror 55 must be moved by the optical path length corresponding to the thickness of the wafer W in the direction away from the collimator fiber 52 (shown by the arrow AA). A predetermined period of time is required for such movement of the reference mirror 55. During the predetermined period of time, the temperature of the optical fiber 54b increases at a constant speed in this example, and therefore, the length of the optical fiber 54b increases and the refractive index thereof also varies. As a result, the optical path length of the measurement light 64 and the reflected light 66b increases. With the increase in the optical path length, there occurs a shift in the interference position PB (refer to FIGS. 4A and 4B), which is the center position of the interference waveform 70 caused by the reflected light 66b from the front-side surface of the wafer W and the reflected light 68 from the reference mirror 55, in the direction of increasing the reference mirror moving distance. Thus, the interference position PB which is at the center of the interference waveform 70 detected at the timing TB is affected by the increase in the optical path length. Specifically, in the case where the difference DD' between the interference position PA detected at the timing TA and the interference position PB determined at the timing TB is calculated for the calculation of the optical path length difference, the difference DD' is equal to the sum of the difference DD between the interference positions PA, PB accurately corresponding to the thickness of the wafer W and an amount of increase of optical path length ΔDD.

At the timing TC in the backward stroke, the interference waveform 70 corresponding to the front-side surface of the wafer W is detected, whereby the interference position PB which is at the center of the interference waveform 70 is measured. Subsequently, to detect the interference waveform 69 corresponding to the rear-side surface of the wafer W, the reference mirror 55 must be moved by the optical path length approximately corresponding to the thickness of the wafer W in the direction (shown by the arrow AA) toward the collimator fiber 52. Such movement of the reference mirror 55 requires a predetermined period of time, and the optical path length of the measurement light 64 and the reflected light 66a increases, in this example, during the predetermined period of time. With the increase of the optical path length, there occurs a shift in the interference position PA, which is at the center of the interference waveform 69 caused by the reflected light 66a from the rear-side surface of the wafer W and the reflected light 68 from the reference mirror 55, in the direction of increasing the reference mirror moving distance. Thus, the interference position PA which is at the center of the interference waveform 69 detected at the timing TD is affected by the increase in the optical path length. Specifically, when the difference DD" between the interference position PB detected at the timing TC and the interference position PA detected at the timing TD is calculated in order to calculate the optical path length difference, the difference DD" is equal to the result of subtraction of an amount of increase in the optical path length ΔDD from the difference DD between the interference positions PA and PB accurately corresponding to the thickness of the wafer W.

The difference DD" between the interference position PB detected at the timing TC and the interference position PA detected at the timing TD in the backward stroke is inversely affected (the amount of increase in the optical path length ΔDD is subtracted) by the temperature of the optical fiber 54b increasing at a constant speed, as compared to the difference DD between the interference position PA detected at the timing TA and the interference position PB detected at the timing TB in the forward stroke (the amount of increase in the optical path length ΔDD is added). It should be noted that, if the moving speed of the reference mirror 55 in the backward stroke is made equal to the moving speed of the reference mirror 55 in the forward stroke, the absolute amount |ΔDD| of increase in the optical path length ΔDD in the backward stroke is equal to that in the forward stroke.

As described above, when the temperature of the optical fiber 54b changes, the optical path length is affected by the temperature change and the optical path length cannot be measured accurately. Thus, the method for measuring the physical quantity of the measurement object in the substrate processing apparatus according to the present embodiment calculates an average value of the difference DD' between the interference position PA at the timing TA and the interference position PB at the timing TB and the difference DD" between the interference position PB at the timing TC and the interference position PA at the timing TD.

Figure 6:
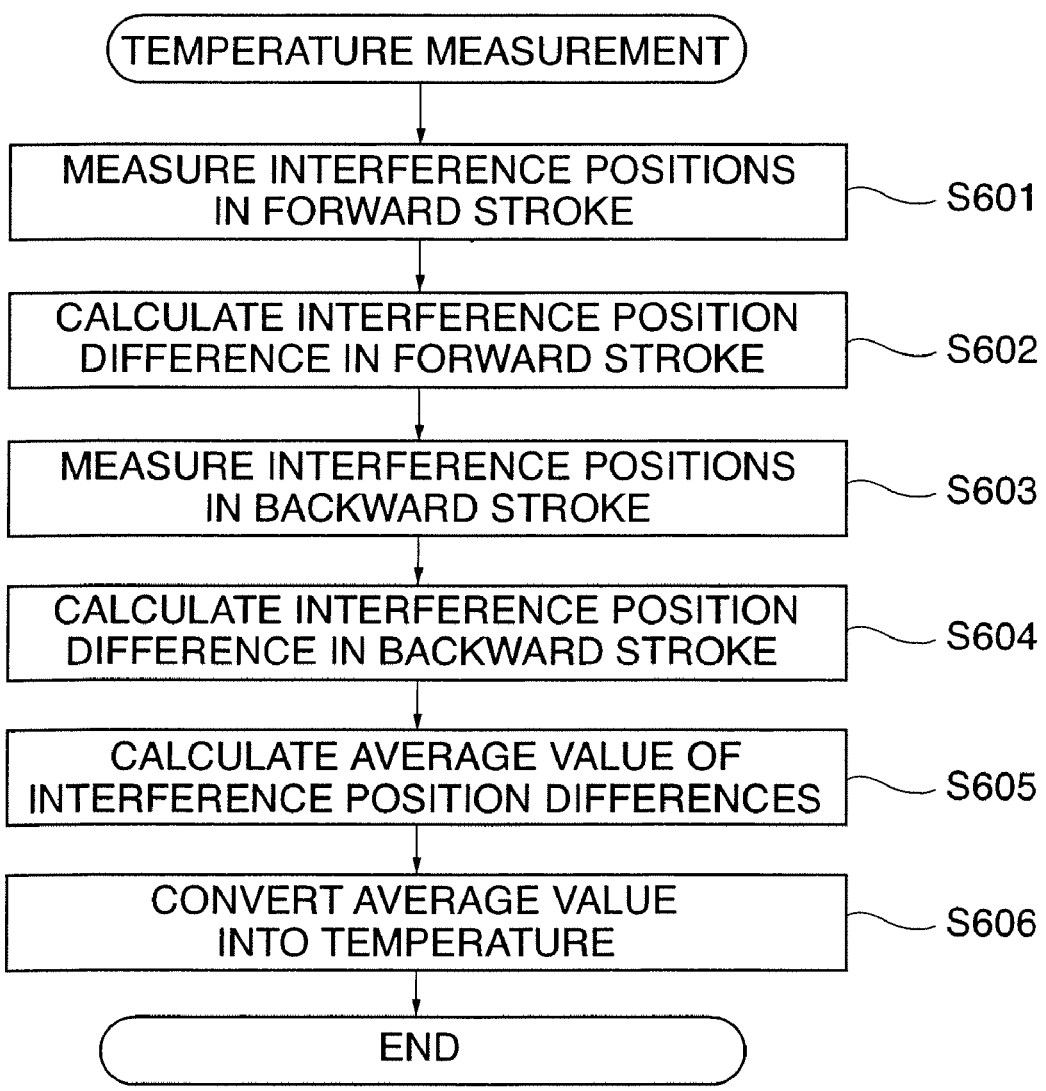
FIG. 6 is a flowchart showing a wafer temperature measuring process in the first embodiment.

FIG. 6 is a flowchart showing a wafer temperature measuring process in the present embodiment.

Referring to FIG. 6, the CPU 60 causes the reference mirror 55 to move in the direction away from the collimator fiber 52 (in the first direction), measures the interference positions PA and PB in the forward stroke at the timings TA and TB, respectively (step S601), and calculates, at a step S602, the difference DD' (first interference position-related value)

between the interference position PA at the timing TA and the interference position PB at the timing TB (hereinafter referred to as the "interference position difference in forward stroke").

Next, the reference mirror 55 remote from the collimator fiber 52 is caused to move in the direction toward the collimator fiber 52. At this time, the moving speed of the reference mirror 55 is made equal to that in the forward stroke. Then, the interference positions PB and PA in the backward stroke are measured at the timings TC and TD, respectively (step S603), and the difference DD" (second interference position-related value) between the interference position PB at the timing TC and the interference position PA at the timing TD (hereinafter referred to as the "interference position difference in backward stroke) is calculated (step S604).

Then, an average value of the interference position difference in forward stroke DD' and that in backward stroke DD" is calculated (step S605), and an optical path length difference is determined based on the calculated average value. Further, a temperature of the wafer W is calculated based on the determined optical path length difference and the temperature conversion database stored in the memory (step S606), whereupon the present process is finished. In the above manner, the temperature of the wafer W is measured.

As described above, the difference DD" between the interference position PB at the timing TC and the interference position PA at the timing TD in the backward stroke is inversely affected (the optical path length is decreased by the amount of increase in the optical path length ΔDD) by the constant speed increase of the temperature of the optical fiber 54b in this example, as compared to the difference DD between the interference position PA at the timing TA and the interference position PB at the timing TB in the forward stroke (the optical path length is increased by the amount of increase in the optical path length ΔDD). According to the process shown in FIG. 6, it is possible to cancel the influences of the increase in the temperature of the optical fiber 54b to the interference position difference by calculating the average value of the interference position differences DD', DD" in the forward and backward strokes, making it possible to accurately determine the optical path length difference from the average value of the interference position differences DD', DD" in the forward and backward strokes. As a result, an accurate measurement of the temperature of the wafer W can be achieved. It should be noted that the existing temperature measurement device in the prior art substrate processing apparatus is not required to be modified to obtain the temperature measurement device 46 for use in execution of the process shown in FIG. 6, which can prevent the increase in costs of the substrate processing apparatus 10.

In the process shown in FIG. 6, the moving speed of the reference mirror 55 is the same between in the forward stroke and in the backward stroke, and therefore, the absolute amount |ΔDD| of influence of increase in temperature of the optical fiber 54b on the interference position difference in backward stroke DD" can be made equal to the absolute amount |ΔDD| of the influence of increase in temperature of the optical fiber 54b on the interference position difference in forward stroke DD', which makes it possible to achieve a further accurate measurement of the temperature of the wafer W.

It should be noted that although the moving speed of the reference mirror 55 is the same between in the forward stroke and in the backward stroke in the process shown in FIG. 6, it is unnecessary to make the moving speed of the reference mirror 55 in the forward stroke equal to that in the backward stroke. Furthermore, it is unnecessary to make the moving speed of the reference mirror 55 constant. However, it is preferable that the difference between the timings TA and TB be equal to the difference between the timings TC and TD, whereby the absolute amount of influence of the increase in temperature of the optical fiber 54b on the interference position difference in backward stroke DD" can be made equal to the absolute amount of influence of the increase in temperature of the optical fiber 54b on the interference position difference in forward stroke DD', making it possible to achieve a further accurate measurement of the temperature of the wafer W.

Next, an explanation will be given of a method for measuring a physical quantity of a measurement object in a substrate processing apparatus according to a second embodiment of the present invention.

As described above, in many cases, the tendency of change in the ambient temperature around the optical fiber 54b is stable. However, the tendency of the temperature change can sometimes be unstable for any accidental factors. For instance, in some cases, the increasing speed of the ambient temperature around the optical fiber 54b can vary, resulting in a change in the speed of increasing the temperature of the optical fiber 54b. Thus, in the method of physical quantity of the measurement object in the substrate processing apparatus of the present embodiment, the interference position differences DD', DD" in the forward and backward strokes are individually corrected.

The present embodiment is the same in construction and function as the aforementioned first embodiment but differs therefrom only in that the interference position differences DD', DD" in the forward and backward strokes are individually corrected. In the following, an explanation will only be given of the different construction and function, with the duplicate explanation on the common construction and function omitted.

Figure 7:
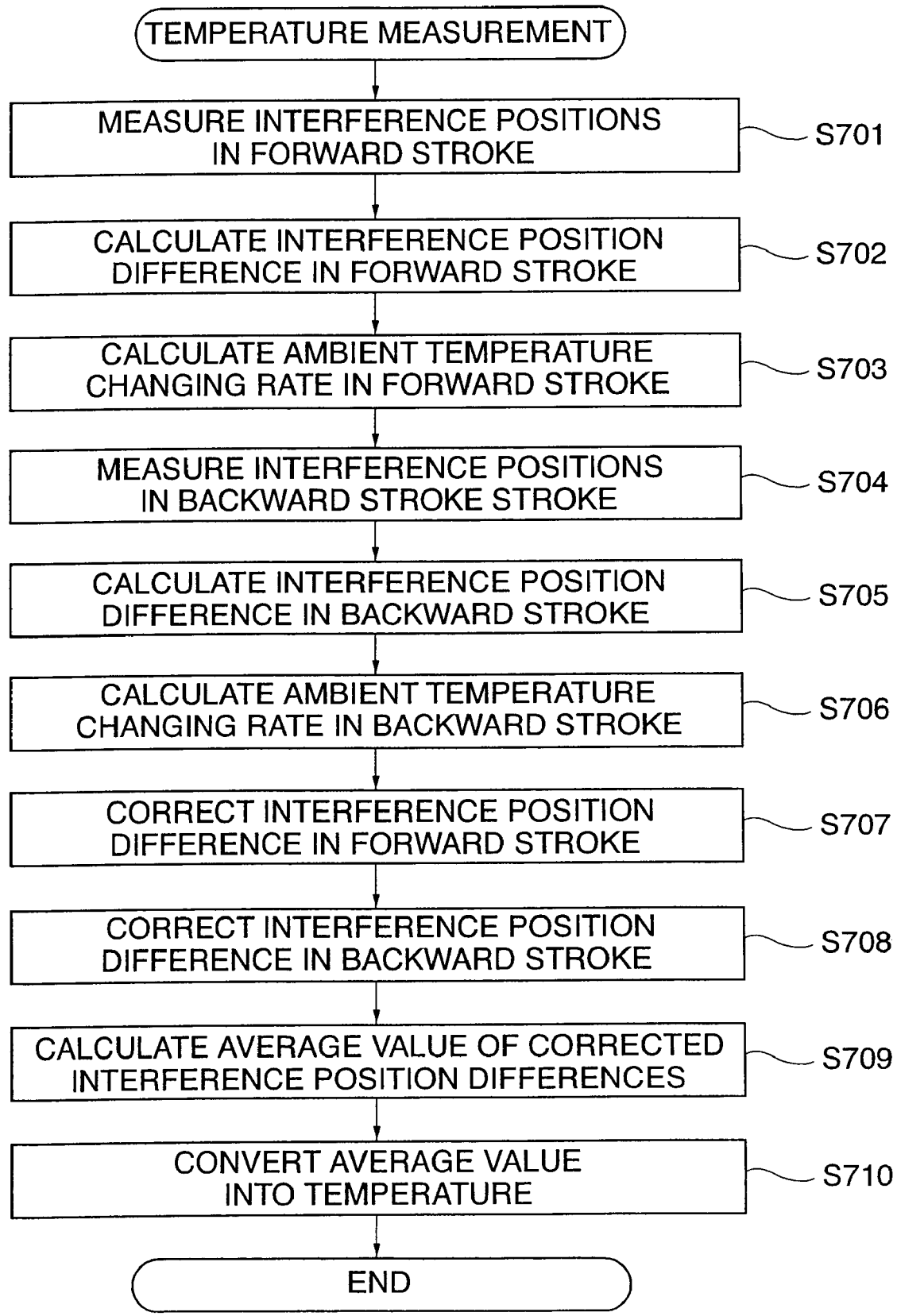
FIG. 7 is a flowchart showing a wafer temperature measuring process in a second embodiment of the present invention.

FIG. 7 is a flowchart showing a wafer temperature measuring process in the present embodiment.

Referring to FIG. 7, the CPU 60 first causes the reference mirror 55 to move in the direction away from the collimator fiber 52, measures the interference positions PA and PB in the forward stroke at timings TA and TB, respectively (step S701), and calculates an interference position difference in forward stroke DD' (step S702). At this time, the CPU 60 measures the ambient temperature around the optical fiber 54b at timings TA and TB using a temperature detecting device (not shown), and calculates the rate of change in the ambient temperature around the optical fiber 54b (first ambient temperature changing rate) during the time period from the timing TA to the timing TB (hereinafter referred to as the "ambient temperature changing rate in forward stroke") (step S703).

Next, the reference mirror 55 remote from the collimator fiber 52 is caused to move in the direction toward the collimator fiber 52. Then, the interference positions PA and PB in the backward stroke are measured at the timings TC and TD, respectively (step S705). Also at this time, the CPU 60 measures the ambient temperature around the optical fiber 54b at timings TC and TD, and calculates a rate of change in the ambient temperature around the optical fiber 54b (second ambient temperature changing rate) during the time period from the timing TC to the timing TD (hereinafter referred to as the "ambient temperature changing rate in backward stroke") (step S706).

Next, based on the time period from the timing TA to the timing TB and the ambient temperature changing rate in forward stroke, an amount of increase of the optical path length in the forward stroke is calculated. Then, the interference position difference in forward stroke DD' is corrected by subtracting the calculated amount of increase of the optical path length in the forward stroke from the interference position difference in forward stroke DD' (step S707).

On the basis of the time period from the timing TC to the timing TD and the ambient temperature changing rate in backward stroke, an amount of increase of the optical path length in backward stroke is calculated. Then, the interference position difference in backward stroke DD" is corrected by adding the calculated amount of increase in the optical path length to the interference position difference in backward stroke DD" (step S708).

Next, an average value of the corrected interference position difference in forward stroke DD' and the corrected interference position difference in backward stroke DD" is calculated (step S709), and determines the optical path length difference from the calculated average value. Then, based on the calculated optical path length difference and the temperature conversion database stored in the memory, the temperature of the wafer W is calculated (step S710), whereupon the present process is finished.

According to the process shown in FIG. 7, the interference position difference in forward stroke DD' and the rate of change in ambient temperature in forward stroke are calculated in the forward stroke, and the interference position difference in backward stroke DD" and the rate of change in ambient temperature in backward stroke are calculated in the backward stroke. Then, the interference position difference in forward stroke DD' is corrected based on the rate of change in the ambient temperature in forward stroke, and the interference position difference in backward stroke DD" is corrected based on the rate of change in the ambient temperature in backward stroke. Even if the rate of change in the ambient temperature in forward stroke differs from that in backward stroke, it is possible to accurately eliminate influences of the temperature change of the optical fiber 54*b* on the interference position differences DD', DD" in the forward and backward strokes, making it possible to achieve an accurate measurement of the temperature of the wafer W.

In the process shown in FIG. 7, the average value of the corrected interference position differences DD', DD" in the forward and backward strokes are calculated, and the calculated average value is converted into a corresponding temperature of the wafer W. Thus, even if there still remain the influences of the temperature change of the optical fiber 54*b* on the interference position differences, such influences can be canceled out, and therefore, it is possible to measure the temperature of the wafer W with reliability and accuracy.

In the process of FIG. 7, the average value of the corrected interference position differences DD', DD" in the forward and backward strokes is calculated and then converted into a corresponding temperature of the wafer W. Alternatively, however, the rate of change in the ambient temperature in forward stroke and that in the backward stroke may be compared, one of the corrected interference position differences that corresponds to a smaller one of the ambient temperature changing rates may be selected, and the selected one of the corrected interference position differences may be converted into a corresponding temperature of the wafer W. This makes it possible to measure the temperature of the wafer W based on the corrected interference position difference which is less affected by the change in the ambient temperature around the optical fiber 54*b*, whereby a reliable and accurate measurement of the temperature of the wafer W can be made.

Figure 8:
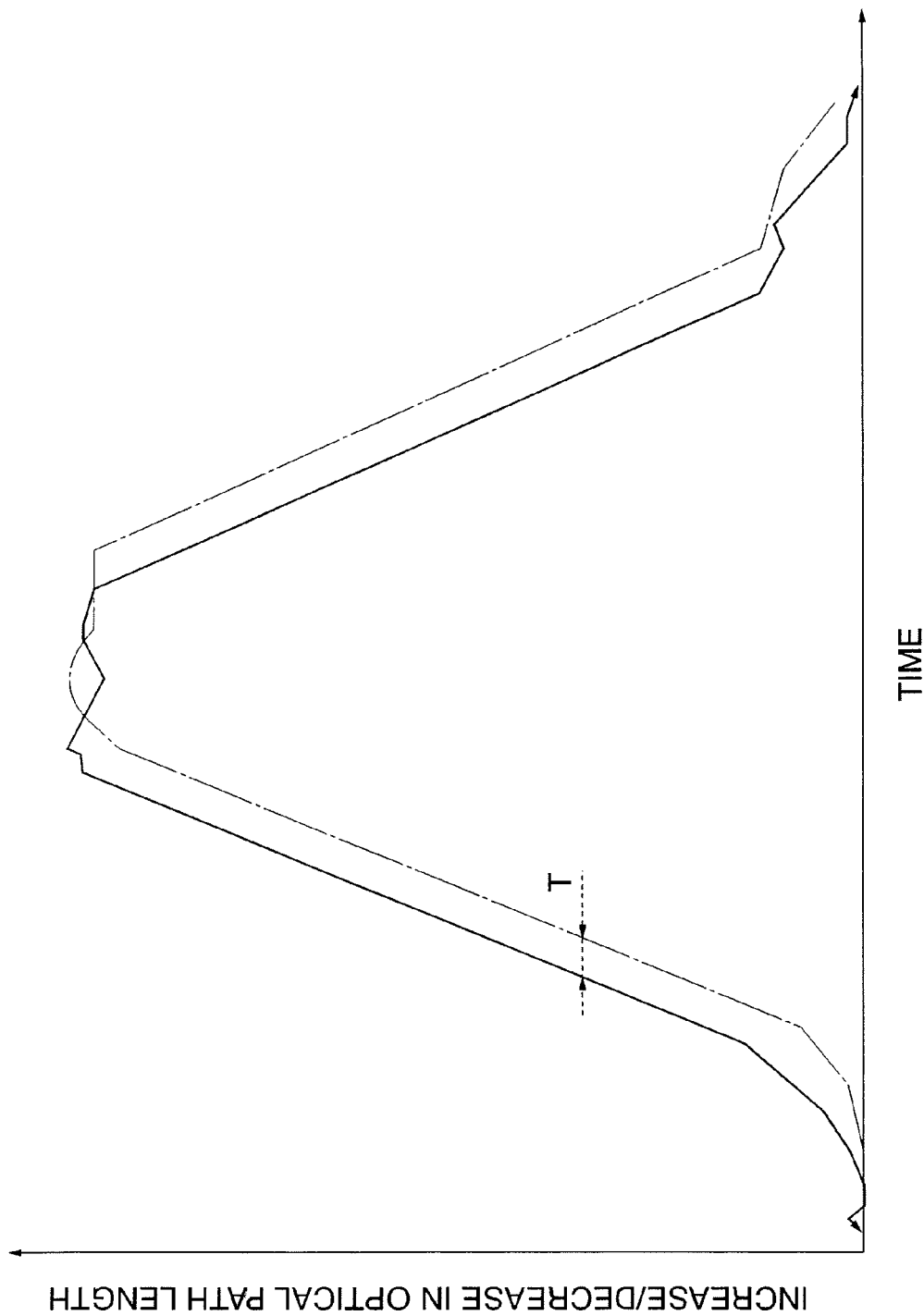
FIG. 8 is a graph showing a relationship between actual increase/decrease in optical path length of an optical fiber and increase/decrease in optical length calculated based on a temperature change in ambient environment around the optical fiber.

The optical fiber 54*b* is covered by resin or the like, and thus there is a time difference between the increase (in general, increasing/decreasing change) in ambient temperature around the optical fiber 54*b* and the increase (in general, increasing/decreasing change) in temperature of the optical fiber 54*b*. As a result, the increase (in general, increase/decrease) in the optical path length calculated based on the change in the ambient temperature around the optical fiber 54*b* sometimes differs from the actual increase (in general, actual increase/decrease) in the optical path length of the optical fiber 54*b*. More specifically, as shown in the graph of FIG. 8, the increase in the actual optical path length of the optical fiber 54*b* shown by the one-dotted chain line may occur with a time lag of T behind the increase in the optical path length shown by the solid line which is calculated based on the change in the ambient temperature around the optical fiber 54*b*. In this case, the increase in the optical path length is inaccurate, which is calculated based on the ambient temperature changing rate in forward stroke measured in the step S703. In view of this, in the present embodiment, the relationship between the increase in the optical path length calculated based on the change in the ambient temperature around the optical fiber 454*b* and the actual increase in the optical path length of the optical fiber 54*b* may be stored beforehand in the memory, and the interference positions PA and PB in forward stroke and the interference positions PB and PA in backward stroke may be corrected based on the relationship stored in the memory. This makes it possible to eliminate influences of the time difference between the change in the ambient temperature around the optical fiber 4*b* and the temperature change of the optical fiber 54*b*, whereby a further reliable and accurate measurement of the temperature of the wafer W can be attained.

Figure 9:
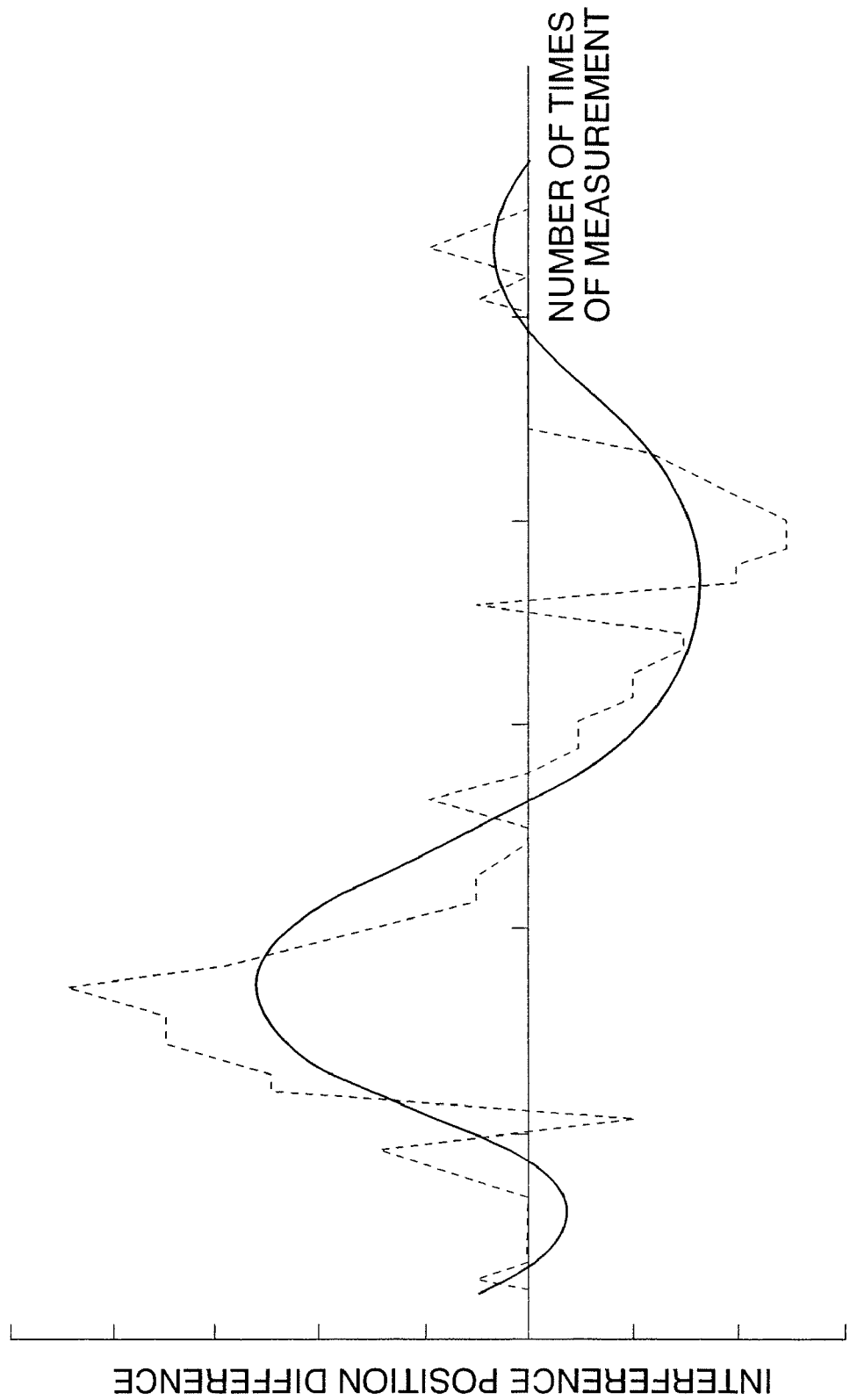
FIG. 9 is a graph showing a history of change in interference position difference obtained when the wafer temperature is repeatedly measured and showing a moving average of interference position differences determined based on the history of change in interference position difference.

In some cases, the increase in length of the optical fiber 54*b* does not coincide with the change in the ambient temperature around the optical fiber 54*b* due to the influence of external factors or the like. Thus, in the present embodiment, it is preferable that the interference position differences DD', DD" in the forward and backward strokes be stored each time the temperature of the wafer W is measured. When the temperature of the wafer W is newly measured, a history of changes in the interference position difference as shown by the broken line in the graph of FIG. 9 be prepared or renewed for the respective interference position differences DD', DD" in the forward and backward strokes, and a moving average of each of the interference position differences be determined as shown by the solid line. Further, a determination should be made as to whether the interference position differences DD', DD" in the forward and backward strokes at the time of newly measuring the temperature of the wafer W are greatly deviated from their moving averages, and the measurement of the temperature of the wafer W should be interrupted or skipped when any of the interference position differences is greatly deviated from the corresponding moving average. As a result, the temperature of the wafer W is prevented from being measured based on the increase in length of the optical fiber 54*b* not corresponding to the change in the ambient temperature around the optical fiber 54*b*, thus making it possible to achieve a reliable and accurate measurement of the temperature of the wafer W.

Next, an explanation will be given of a method for measuring a physical quantity of a measurement object of a substrate processing apparatus according to a third embodiment of the present invention.

The present embodiment is basically the same in construction and function as the first embodiment, and only differs therefrom in that the way of determining the optical length path is changed based on the rate of change in ambient temperature in the forward stroke and that in the backward stroke. Thus, the duplicate explanation on the common construction and function will be omitted, and an explanation will be given of only on different construction and function.

Figure 10:
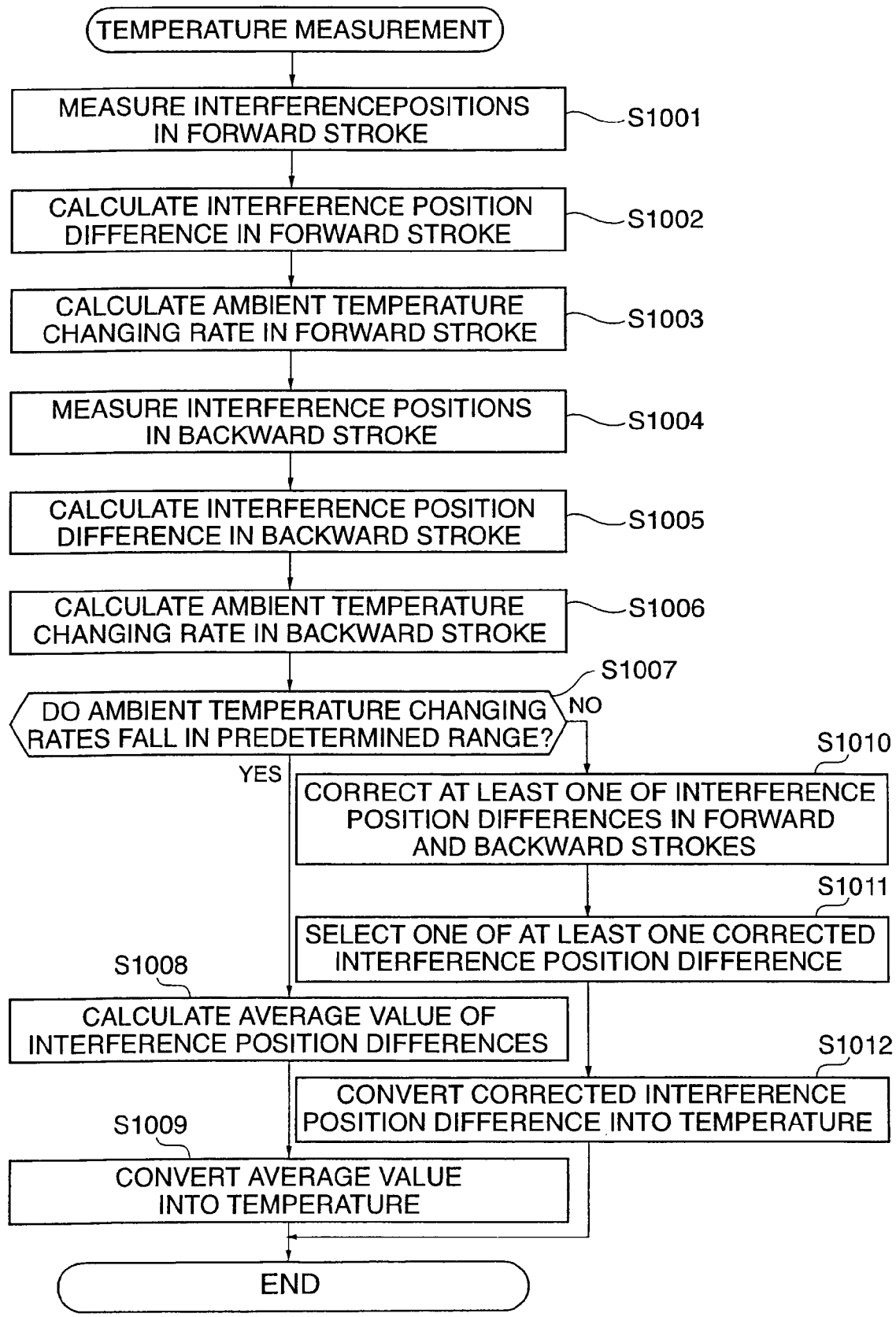
FIG. 10 is a flowchart showing a wafer temperature measuring process in a third embodiment of the present invention.

FIG. 10 is a flowchart showing a wafer temperature measuring process in the present embodiment.

Referring to FIG. 10, the CPU 60 causes the reference mirror 55 to move in the direction away from the collimator fiber 52, measures interference positions PA and PB in the forward stoke at timings TA and TB, respectively (step S1001), and calculates an interference position difference in forward stroke DD' (step S1002). Further, the ambient temperature around the optical fiber 54b is measured at timings TA and TB, and calculates the rate of change in ambient temperature in the forward stroke (step S1003).

Then, the reference mirror 55 remote from the collimator fiber 52 is caused to move in the direction toward the collimator fiber 52. Interference positions PB and PA in the backward stroke are measured at timings TC and TD, respectively (step S1004), and an interference position difference in backward stroke DD" is calculated (step S1005). Furthermore, the ambient temperature around the optical fiber 54b is measured at timings TC and TD, and the rate of change in ambient temperature in the backward stroke is calculated (step S1006).

Then, it is determined whether or not the rate of change in ambient temperature in the forward stroke and that in the backward stroke fall within a predetermined range (step S1007), and if both of them fall within the predetermined range, then an average value of the interference position differences DD', DD" in the forward and backward strokes is calculated (step S1008). Further, an optical path length is determined from the calculated average value, and a temperature of the wafer W is calculated based on the determined optical path length and the temperature conversion table stored in the memory (step S1009), whereupon the present process is finished.

As a result of the determination at the step S1007, when it is determined that one or both of the rates of change in ambient temperature in the forward and backward strokes do not fall within the predetermined range (No to the step S1007), an amount of increase (more generally, increase/decrease) in optical path length in the forward stroke is calculated based on the time period from the timing TA to the timing TB and the rate of change in ambient temperature in the forward stroke. Then, the calculated amount of increase in optical path length in the forward stroke is subtracted from the interference position difference in forward stroke DD' to thereby correct the interference position difference in forward stroke DD'. Alternatively or in combination with the above, an amount of increase in optical path length in the backward stoke is calculated based on the time period from the timing TC to the timing TD and the rate of change in ambient temperature in the backward stroke, and the calculated amount of increase in optical path length in the backward stroke is added to the interference position difference DD" in the backward stroke to thereby correct the interference position difference in the backward stroke (step S1010).

Next, the rate of change in ambient temperature in the forward stroke is compared with that in the backward stroke, and one of the at least one corrected interference position difference corresponding to a smaller one of the changing rates of ambient temperature is selected (step S1011). Then, the optical length difference is determined from the selected one of the corrected interference position differences, and a temperature of the wafer W is calculated based on the determined optical path length and the temperature conversion table stored in the memory (step S1012), whereupon the present process is completed.

In the process shown in FIG. 10, the interference position difference in forward stroke DD' and the rate of change in ambient temperature in forward stroke are calculated in the forward stroke, and the interference position difference in backward stroke DD" and the rate of change in ambient temperature in backward stroke are calculated in the backward stroke. If both the rates of change in ambient temperature in forward and backward strokes fall within the predetermined range, then an average value of the interference position differences DD', DD" in the forward and backward strokes is calculated, whereas if one or both of the rates of change in ambient temperature in forward and backward strokes fall outside the predetermined range, the interference position difference in forward stroke DD' is corrected based on the changing rate of ambient temperature in forward stroke and/or the interference position difference in backward stroke DD" is corrected based on the changing rate of ambient temperature in backward stroke. The interference position difference in forward stroke DD' is inversely affected by the increase in temperature of the optical fiber 54b compared to the influence on the interference position difference in backward stroke DD". Thus, by calculating an average value of the interference position differences DD', DD" in forward and backward strokes, influences of the increase in temperature of the optical fiber 54b on the respective interference position differences can be canceled out. Even if the rate of change in ambient temperature in the forward stroke differs from that in the backward stroke, the influences of the increase in temperature of the optical fiber 54b on the interference position differences DD', DD" in forward and backward strokes can be accurately eliminated. As a result, the temperature of the wafer W can be measured with accuracy. Furthermore, since the way of calculating the temperature of the wafer W is changed in accordance with the result of comparison between the rates of change in ambient temperature in the forward and backward strokes, the temperature measurement of the wafer W can be carried out efficiently.

In the method for measuring a physical quantity of a measurement object in the substrate processing apparatus according to each of the aforementioned embodiments, there have been explained the cases where the temperature measurement device 46 for detecting the temperature at one point on the wafer W is employed. However, the temperature detecting point on the wafer W is not limited to one. The temperature detection may be made at a plurality of points, e.g., at two points on the wafer W.

Figure 11:
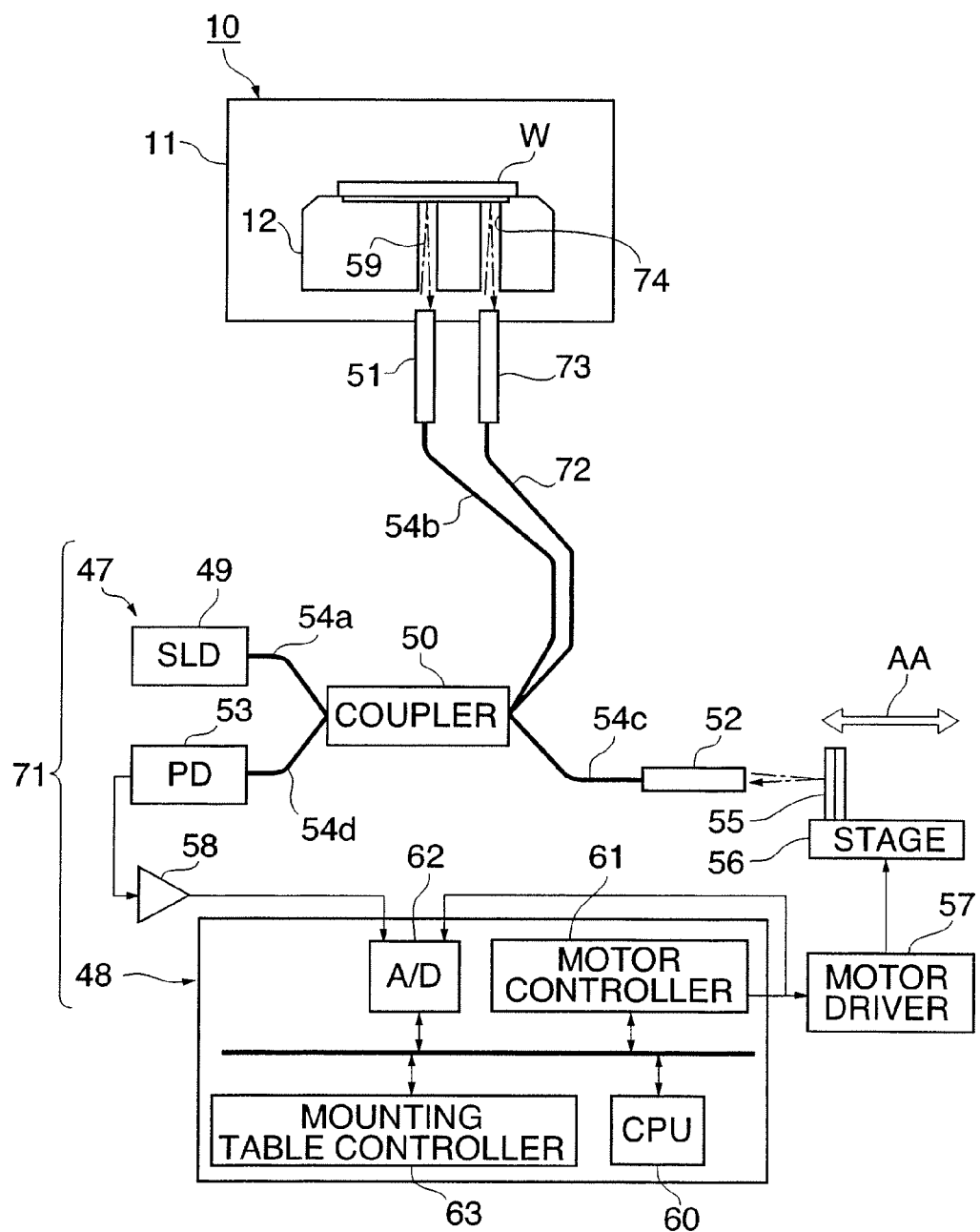
FIG. 11 is a block diagram showing a schematic construction of a temperature measurement apparatus that detects the temperature at two locations on a wafer.

FIG. 11 is a block diagram showing a schematic configuration of a temperature measurement device for detecting the temperature on two points on the wafer.

Referring to FIG. 11, the temperature measurement device 71 is different from the temperature measurement device 46 in that it further comprises an optical fiber 72 and a collimator fiber 73 in addition to the elements 51 and 54b in order to detect the temperature on the two points on the wafer W. Like parts are denoted by like numerals and explanation thereof will be omitted.

In the temperature measurement device 71, the collimator fiber 51 is disposed to face the center of the rear-side face of the wafer W through the temperature detection hole 59, whereas the collimator fiber 73 is disposed to face the peripheral portion of the rear-side face of the wafer W through a temperature detection hole 74 formed in the mounting table 12. The collimator fiber 73 irradiates part of low-coherence light split by means of the optical fiber coupler 50 toward the peripheral portion of the rear-side surface of the wafer W through the temperature detection hole 74, receives reflected light of low-coherence light from the wafer W, and transmits the same to the PD 53.

The measurement light irradiated from the collimator fiber 73 to the wafer W is reflected on the peripheral portion of the rear-side surface and that of the front-side surface of the wafer W, and is incident on the optical fiber coupler 50 as reflected light (hereinafter referred to as the "peripheral reflected light"). In a case where the reference mirror 55 is caused to horizontally move to thereby change the total optical path length of the reference light 65 and the reflected light 68, when the total optical path length of the measurement light and the periphery reflected light from the front-side surface of the wafer W (hereinafter referred to as the "front-side peripheral reflected light") coincides with the total optical path length of the reference light 65 and the reflected light 68, interference occurs between the front-side peripheral reflected light and the reflected light 68. When the total optical path length of the measurement light and the peripheral reflected light from the rear-side surface (hereinafter referred to as the "rear-side peripheral reflected light") coincides with the total optical path length of the reference light 65 and the reflected light 68, interference occurs between the rear-side peripheral reflected light and the reflected light 68. These interferences are detected by the PD 53. The PD outputs an output signal when detecting any of the interferences.

When the reflected light 68 from the reference mirror 55 interferes with the rear-side peripheral reflected light, an interference waveform 75 at an interference position PE is detected, as shown in the graph of FIG. 12A. When the reflected light 68 from the reference mirror 55 interferes with the front-side peripheral reflected light, an interference waveform 76 at an interference position PF is detected. The interference position PE corresponds to the total optical path length of the measurement light 64 and the rear-side peripheral reflected light, whereas the interference position PF corresponds to the total optical path length of the measurement light 64 and the front-side peripheral reflected light. Thus, the difference DG between the interference positions PE and PF corresponds to the difference between the optical path length of the rear-side peripheral reflected light and that of the front-side peripheral reflected light, and the difference DG corresponds to the optical thickness of the peripheral portion of the wafer W. When there is a change in temperature of the wafer W, the optical thickness of the peripheral portion of the wafer W varies due to thermal expansion and the like, as shown in the graph of FIG. 12B, and the interference positions PE and PF are shifted from those shown in FIG. 12A.

In the temperature measurement device having the above-mentioned construction, either one of the difference DD between the interference positions PA and PB and the difference DG between the interference positions PE and PF is selected, and the process shown in FIG. 6, 7, or 10 is executed based on the selected interference position difference. At this time, by selecting one of the interference position differences corresponding to a location that is hard to be affected by variation factors other than the temperature of the wafer W, a further accurate measurement of the temperature of the wafer W can be achieved.

It should be noted that in a case where the temperature of the wafer W is detected at three or more positions on the wafer, it is enough to select one of a plurality of interference position differences.

In the method for measuring a physical quantity of a measurement object in the substrate processing apparatus according to each of the embodiments, the semiconductor device wafer is used as the measurement object for which temperature measurement is to be made. However, the measurement object to be subjected to the temperature measurement is not limited thereto. For example, as the measurement object, there may be mentioned a glass substrate such as a liquid crystal display (LCD) and a flat panel display (FPD), or a component part of the plasma processing apparatus 10, which is disposed in the chamber 11 of the apparatus 10, such as a focus ring 27 made of silicon. In other words, the method for measuring a physical quantity of a measurement object is applicable to any measurement object for which a contactless temperature measurement is preferable.

In the temperature measurement device 46 to which is applied the method for measuring a physical quantity of a measurement object in the substrate processing apparatus according to each of the aforementioned embodiments, the optical fiber 54b is used as the optical path for the measurement light 64 and the reflected light 66a, 66b. However, the optical path is not required to be constituted by an optical fiber, but may be one whose optical path length varies according to a change in ambient environment. Even in such a case, influences of a change in ambient environment on the optical path can be removed by an appropriate one of the above described methods for measuring a physical quantity of a measurement object.

It is to be understood that the object of the present invention may also be accomplished by supplying a computer (temperature calculation device 48) with a storage medium in which a program code of software, which realizes the functions of any of the above described embodiments, is stored, and causing the computer to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a RAM, an NV-RAM, a floppy (registered trademark) disk, a hard disk, an optical disk such as a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

The program code may be in any of the forms of an object code, a program code executed by an interpreter, script data supplied to an OS (Operating System), etc.

What is claimed is:

1. A method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, said method comprising the steps of:

(a) calculating a first interference position-related value that is related to a position of the movable reflection device in which interference occurs between the first reflected light and the second reflected light as the movable reflection device is caused to move in a first direction;

(b) calculating a second interference position-related value that is related to a position of the movable reflection device in which interference occurs between the first reflected light and the second reflected light as the movable reflection device is caused to move in a second direction that is opposite to the first direction; and (c) calculating an average value of the first and second interference position-related values.

2. The method according to claim 1, further comprising a step of converting the calculated average value into a corresponding temperature of the measurement object.

3. The method according to claim 1, wherein the measurement object is in a form of plate, each of the first and second interference position-related values corresponds to thickness of the measurement object, and the predetermined physical quantity is the thickness of the measurement object.

4. The method according to claim 3, wherein the light receiving device receives the first reflected light from a front-side surface of the measurement object and the first reflected light from a rear-side surface of the measurement object, wherein the first interference position-related value corresponds to a difference between a position of the movable reflection device in which interference occurs between the first reflected light from the rear-side surface of the measurement object and the second reflected light and a position of the movable reflection device in which interference occurs between the first reflected light from the front-side surface of the measurement object and the second reflected light as the movable reflection device is caused to move in the first direction, and wherein the second interference position-related value corresponds to a difference between a position of the movable reflection device in which interference occurs between the first reflected light from the front-side surface of the measurement object and the second reflected light and a position of the movable reflection device in which interference occurs between the first reflected light from the rear-side surface of the measurement object and the second reflected light as the movable reflection device is caused to move in the second direction.

5. The method according to claim 4, wherein the light receiving device receives the first reflected light from each of a plurality of measurement points on the front-side surface of the measurement object and the first reflected light from each of a plurality of measurement points on the rear-side surface of the measurement object corresponding to respective ones of the plurality of measurement points on the front-side surface, wherein there are a plurality of the first interference position-related values corresponding in number to the plurality of measurement points and each corresponding to the thickness of the measurement object, wherein there are a plurality of the second interference position-related values corresponding in number to the plurality of measurement points and each corresponding to the thickness of the measurement object, and wherein one of the plurality of the first interference position-related values is selected and one of the plurality of the second interference position-related values is selected, and the thickness of the measurement object is calculated based on the selected first and second interference position-related values.

6. The method according to claim 1, wherein a speed at which the movable reflection device is caused to move in the first direction is equal to a speed at which the movable reflection device is caused to move in the second direction.

7. The method according to claim 4, wherein a difference between a timing in which the interference occurs between the first reflected light from the rear-side surface of the measurement object and the second reflected light and a timing in which the interference occurs between the first reflected light from the front-side surface of the measurement object and the second reflected light as the movable reflection device is caused to move in the first direction is equal to a difference between a timing in which the interference occurs between the first reflected light from the front-side surface of the measurement object and the second reflected light and a timing in which the interference occurs between the first reflected light from the rear-side surface of the measurement object and the second reflected light as the movable reflection device is caused to move in the second direction.

8. A method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, said method comprising the steps of:

(a) calculating a first interference position-related value that is related to a position of the movable reflection device in which interference occurs between the first reflected light and the second reflected light as the movable reflection device is caused to move in a first direction;

(b) calculating a first rate of change in ambient temperature as the movable reflection device is caused to move in the first direction;

(c) calculating a second interference position-related value that is related to a position of the movable reflection device in which interference occurs between the first reflected light and the second reflected light as the movable reflection device is caused to move in a second direction that is opposite to the first direction;

(d) calculating a second rate of change in ambient temperature as the movable reflection device is caused to move in the second direction;

(e) correcting the first interference position-related value based on the first rate of change in ambient temperature; and (f) correcting the second interference position-related value based on the second rate of change in ambient temperature.

9. The method according to claim 8, further comprising: a step of calculating an average value of the first and second interference position-related values; and a step of converting the calculated average value into a corresponding temperature of the measurement object.

10. The method according to claim 8, further comprising: a step of selecting either one of the first and second interference position-related values based on a comparison between the first and second rates of change in ambient temperature; and a step of converting the selected one of the first and second interference position-related values into a corresponding temperature of the measurement object.

11. A method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, said method comprising the steps of:
- (a) calculating a first interference position-related value that is related to a position of the movable reflection device in which interference occurs between the first reflected light and the second reflected light as the movable reflection device is caused to move in a first direction;
- (b) calculating a first rate of change in ambient temperature as the movable reflection device is caused to move in the first direction;
- (c) calculating a second interference position-related value that is related to a position of the movable reflection device in which interference occurs between the first reflected light and the second reflected light as the movable reflection device is caused to move in a second direction that is opposite to the first direction;
- (d) calculating a second rate of change in ambient temperature as the movable reflection device is caused to move in the second direction;
- (e) determining whether or not the first and second rates of change in ambient temperature fall within a predetermined range;
- (f) calculating an average value of the first and second interference position-related values when the first and second rates of change in ambient temperature fall within the predetermined range; and
- (g) correcting at least one of the first and second interference position-related values based on at least corresponding one of the first and second rates of change in ambient temperature when the at least corresponding one of the first and second rates of change in ambient temperature falls outside the predetermined range.

12. A computer-readable storage medium storing a program that causes a computer to execute a method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, the method comprising the steps of:
- (a) calculating a first interference position-related value that is related to a position of the movable reflection device in which interference occurs between the first reflected light and the second reflected light as the movable reflection device is caused to move in a first direction;
- (b) calculating a second interference position-related value that is related to a position of the movable reflection device in which interference occurs between the first reflected light and the second reflected light as the movable reflection device is caused to move in a second direction that is opposite to the first direction; and
- (c) calculating an average value of the first and second interference position-related values.

13. A computer-readable storage medium storing a program that causes a computer to execute a method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, the method comprising the steps of:
- (a) calculating a first interference position-related value that is related to a position of the movable reflection device in which interference occurs between the first reflected light and the second reflected light as the movable reflection device is caused to move in a first direction;
- (b) calculating a first rate of change in ambient temperature as the movable reflection device is caused to move in the first direction;
- (c) calculating a second interference position-related value that is related to a position of the movable reflection device in which interference occurs between the first reflected light and the second reflected light as the movable reflection device is caused to move in a second direction that is opposite to the first direction;
- (d) calculating a second rate of change in ambient temperature as the movable reflection device is caused to move in the second direction;
- (e) correcting the first interference position-related value based on the first rate of change in ambient temperature; and
- (f) correcting the second interference position-related value based on the second rate of change in ambient temperature.

14. A computer-readable storage medium storing a program that causes a computer to execute a method for measuring a physical quantity of a measurement object in a substrate processing apparatus using a physical quantity measuring apparatus, said physical quantity measuring apparatus including a light receiving device that receives first reflected light of light irradiated on the measurement object and second reflected light of light irradiated on a movable reflection device, a movement control device that causes the movable reflection device to move so as to cause interference to occur between the first reflected light and the second reflected light, and a physical quantity calculation device that calculates a predetermined physical quantity of the measurement object based on a position of the movable reflection device in which the interference occurs, the method comprising the steps of:

(a) calculating a first interference position-related value that is related to a position of the movable reflection device in which interference occurs between the first reflected light and the second reflected light as the movable reflection device is caused to move in a first direction;

(b) calculating a first rate of change in ambient temperature as the movable reflection device is caused to move in the first direction;

(c) calculating a second interference position-related value that is related to a position of the movable reflection device in which interference occurs between the first reflected light and the second reflected light as the movable reflection device is caused to move in a second direction that is opposite to the first direction;

(d) calculating a second rate of change in ambient temperature as the movable reflection device is caused to move in the second direction;

(e) determining whether or not the first and second rates of change in ambient temperature fall within a predetermined range;

(f) calculating an average value of the first and second interference position-related values when the first and second rates of change in ambient temperature fall within the predetermined range; and (g) correcting at least one of the first and second interference position-related values based on at least corresponding one of the first and second rates of change in ambient temperature when the at least corresponding one of the first and second rates of change in ambient temperature falls outside the predetermined range.

* * * * *